(12) United States Patent
Noda et al.

(10) Patent No.: US 7,127,570 B2
(45) Date of Patent: Oct. 24, 2006

(54) PROXIMITY COMMUNICATION SYSTEM, PROXIMITY COMMUNICATION METHOD, DATA MANAGING APPARATUS AND DATA MANAGEMENT METHOD, STORAGE MEDIUM, AND COMPUTER PROGRAM

(75) Inventors: Takuro Noda, Tokyo (JP); Makoto Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 428 days.

(21) Appl. No.: 10/472,592

(22) PCT Filed: Dec. 11, 2002

(86) PCT No.: PCT/JP02/12953

§ 371 (c)(1),
(2), (4) Date: Sep. 22, 2003

(87) PCT Pub. No.: WO33/065298

PCT Pub. Date: Aug. 7, 2003

(65) Prior Publication Data

US 2004/0243990 A1  Dec. 2, 2004

(30) Foreign Application Priority Data

Jan. 25, 2002  (JP) .............................. 2002-17764

(51) Int. Cl.
*G06F 12/00* (2006.01)
(52) U.S. Cl. ..................... 711/156; 717/154
(58) Field of Classification Search ............... None
See application file for complete search history.

(56) References Cited

U.S. PATENT DOCUMENTS

| | | | | |
|---|---|---|---|---|
| 4,887,234 A | * | 12/1989 | Iijima | 711/173 |
| 5,226,145 A | * | 7/1993 | Moronaga et al. | 711/202 |
| 5,538,436 A | * | 7/1996 | Garney | 439/270 |
| 5,586,293 A | * | 12/1996 | Baron et al. | 711/118 |
| 5,590,306 A | * | 12/1996 | Watanabe et al. | 711/115 |
| 6,330,633 B1 | | 12/2001 | Kusakabe et al. | |
| 6,363,455 B1 | | 3/2002 | Kusakabe et al. | |
| 2002/0055951 A1 | * | 5/2002 | Shigetomi et al. | 707/501.1 |

FOREIGN PATENT DOCUMENTS

| | | |
|---|---|---|
| GB | 2 248 707 A | 4/1992 |
| JP | 6-89371 | 3/1994 |

(Continued)

OTHER PUBLICATIONS

Structured Computer Organization 2$^{nd}$ ed., Tanenbaum, © 1984, Prentice-Hall, p. 11.*

(Continued)

*Primary Examiner*—Reginald Bragdon
*Assistant Examiner*—Horace L. Flournoy
(74) *Attorney, Agent, or Firm*—Finnegan, Henderson, Farabow, Garrett & Dunner, L.L.P.

(57) ABSTRACT

In a non-contact IC card, one block includes 16 bytes as a unit of reading/writing information, and the writing of the information up to 8 blocks which is a maximum simultaneous write size is guaranteed. The structure of a TOC (Table Of Contents) is built on a memory space of the card. When information exceeding the maximum simultaneous write size is written in, single transaction completes the corresponding TOC rewrite so as to prevent contents of the memory from being damaged even if the card is removed from a write device in the middle of writing. When writing data larger than a predetermined size, even if communication between devices is interrupted at any timing, the data consistency can be guaranteed suitably.

36 Claims, 15 Drawing Sheets

FOREIGN PATENT DOCUMENTS

| | | |
|---|---|---|
| JP | 11-161562 | 6/1999 |
| JP | 2000-99656 | 4/2000 |

OTHER PUBLICATIONS

International Search Report for Application No. PCT/JP02/12953, dated Apr. 22, 2003.

Susumu Kusakabe, "Denshi Seifu, IT Sobi Toshi Koso no Key Technology 'IC Card' wa Mirai o Do Hirakuka Future with IC Card Sony no IC Card Senryaku," Electronics, Ohmsha, Ltd., Jun. 1, 2001, vol. 46, No. 6, pp. 37 to 40.

Susumu Kusakabe, 2000 Nen Seiki Goe no Key Technology Wireless Card Tankentai Saishin Doko Hen <Sekai no Senko Jirei> Hong Kong no Kotsu Kyoyo Card System, Electronics, Ohmsha, Ltd., Mar. 1, 1999, vol. 44, No. 3, pp. 50-52.

* cited by examiner

FIG. 9

| D0 | D1 | D2 | D3 | D4 | D5 | D6 | D7 | D8 | D9 | Da | Db | Dc | Dd | De | Df |
|---|---|---|---|---|---|---|---|---|---|---|---|---|---|---|---|
| MEDIA TYPE | ATTRIBUTE | TOC START ADDRESS | | NUMBER OF ENTRIES | | GENERAL DESCRIPTION START ADDRESS | | RESERVATION | | | | | | | |

FIG. 10

| D0 | D1 | D2 | D3 | D4 | D5 | D6 | D7 | D8 | D9 | Da | Db | Dc | Dd | De | Df |
|---|---|---|---|---|---|---|---|---|---|---|---|---|---|---|---|
| TYPE | ATTRIBUTE | DATA BLOCK START ADDRESS | | NUMBER OF BLOCKS | | NEXT TOC ADDRESS | | DATA SIZE | | | | RESERVATION | | | |

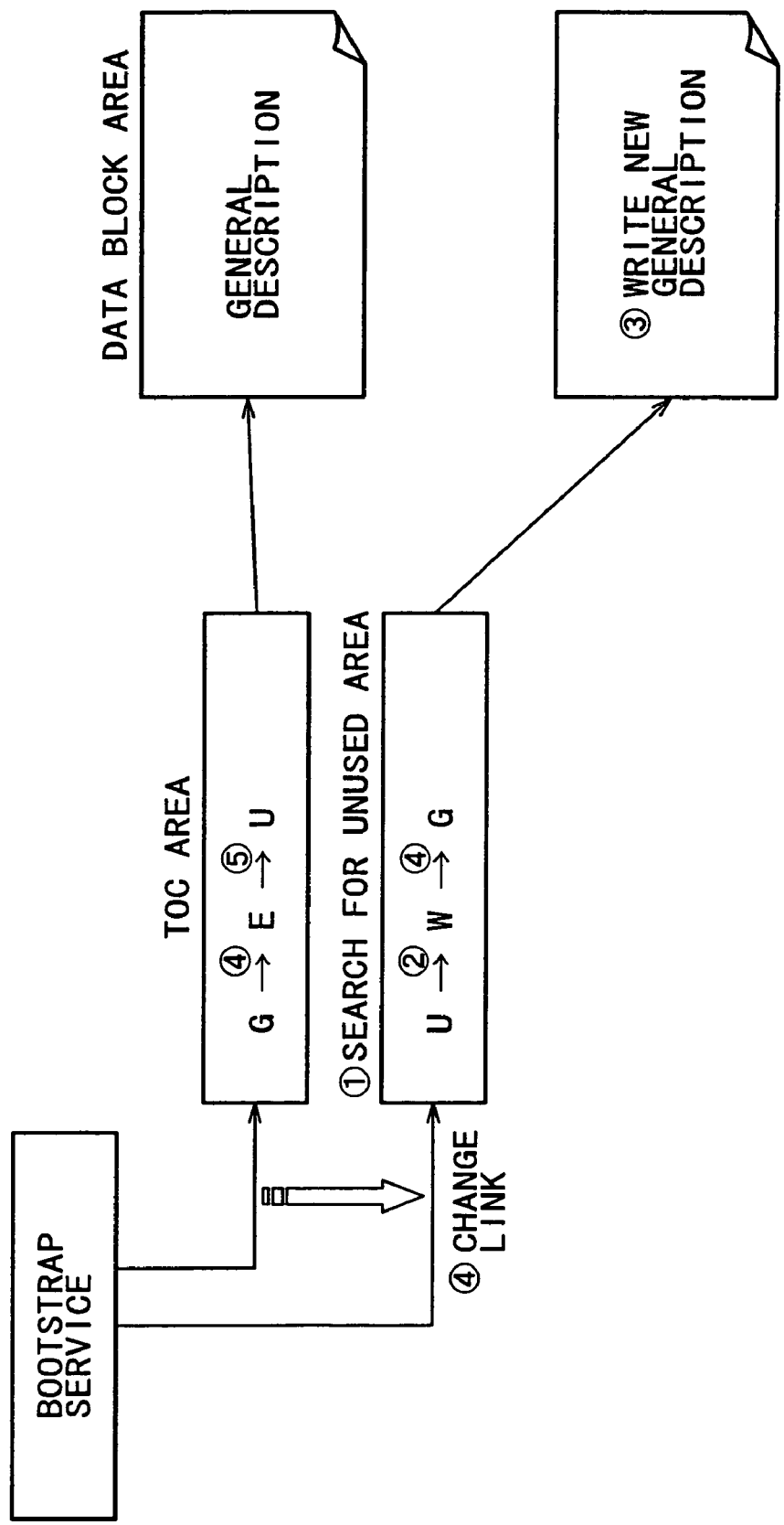

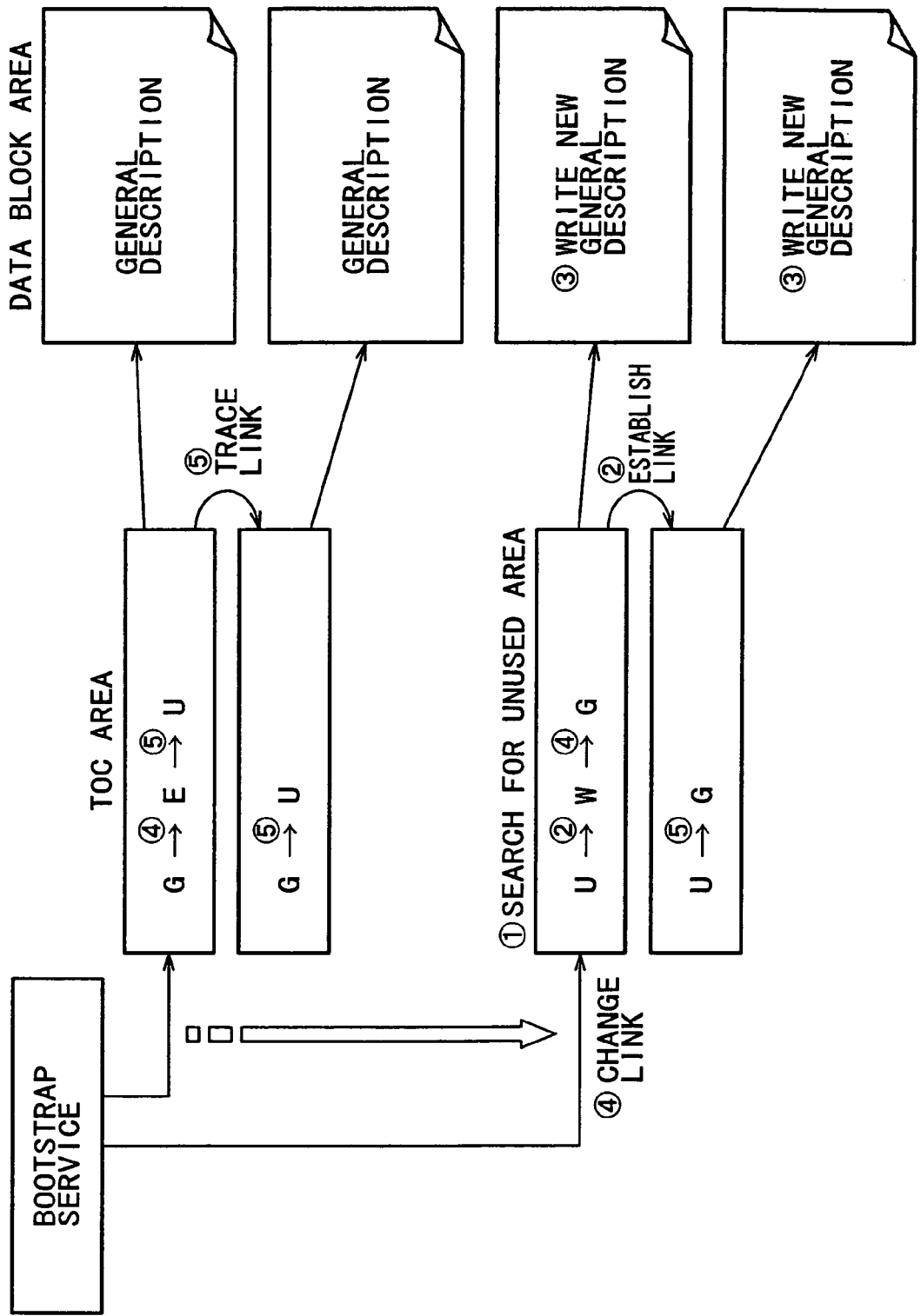
F I G. 1 2

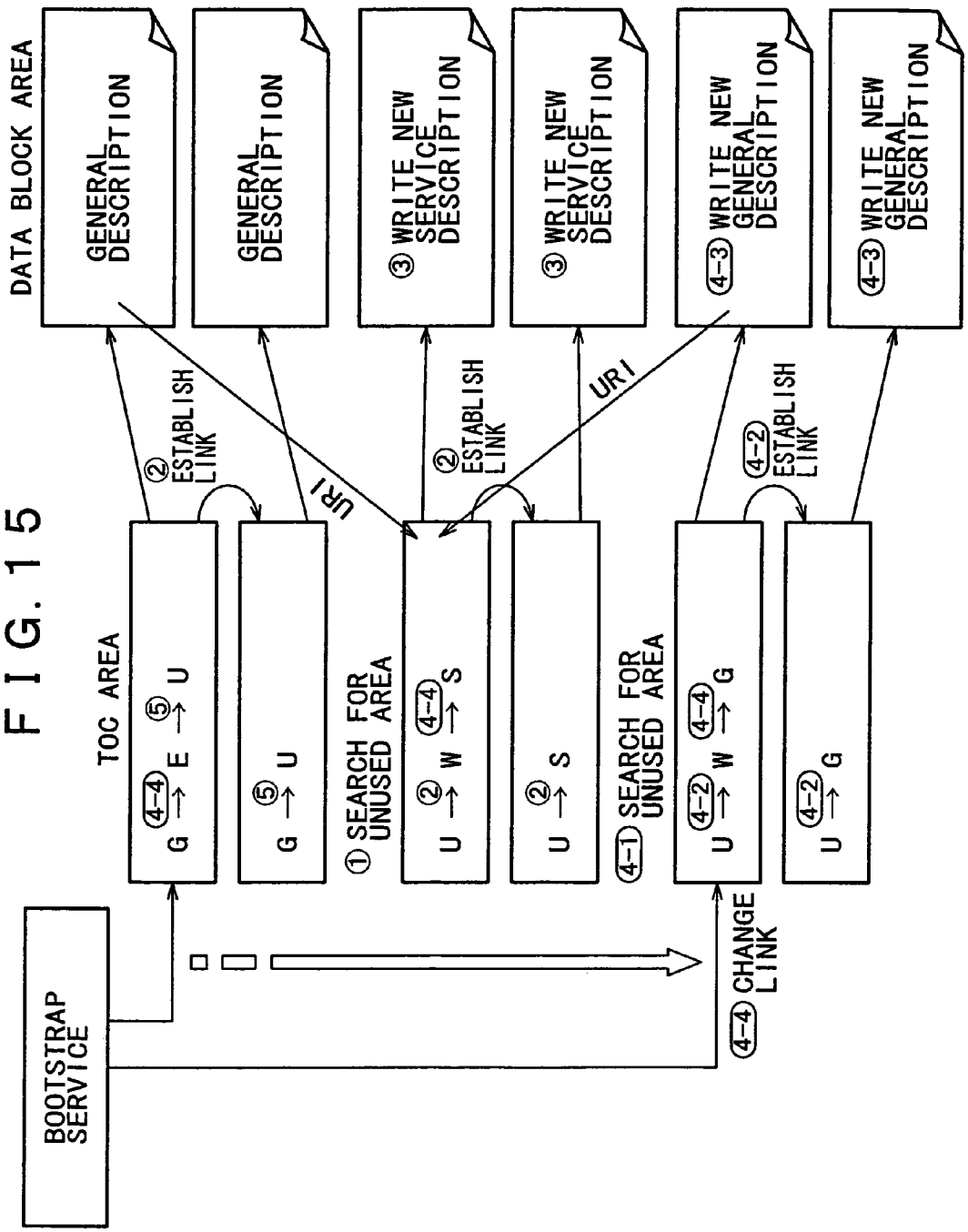
F I G. 15

PROXIMITY COMMUNICATION SYSTEM, PROXIMITY COMMUNICATION METHOD, DATA MANAGING APPARATUS AND DATA MANAGEMENT METHOD, STORAGE MEDIUM, AND COMPUTER PROGRAM

TECHNICAL FIELD

The present invention relates to a non-contact proximity communication system employed in a local area, and in particular to a proximity communication system, as typified by a non-contact IC card technology, in which a user physically places devices for performing the proximity communication closer to each other to automatically start its operation when at least one of the devices finds the other counterpart device.

More particularly, the present invention relates to a proximity communication system and a proximity communication method, a data management apparatus and a data management method, a storage medium, and a computer program in which a user physically places devices closer to each other so as to operate automatically and such an operation is guaranteed even if the communication between the devices is interrupted at any timing by the user's separating the devices from each other, and specifically relates to a proximity communication system and a proximity communication method, a data management apparatus and a data management method, a storage medium, and a computer program in which the data consistency is guaranteed if the communication between the devices is interrupted at any timing during the writing of data larger than a predetermined size.

BACKGROUND ART

An example of a radio communication means applicable only in a local area is a non-contact IC card.

Such radio communications are realized based on the principles of electromagnetic induction, for example. In other words, a radio communication system includes an IC card having a memory function, a card reader/writer for accessing a memory of the IC card for reading and writing, and an antenna at a side of the card reader/write and a loop coil at a side of the IC card form single transformer as a system.

On the card reader/writer side, a current to flow in the antenna is modulated so that an induced voltage at the loop coil of the IC card is modulated so as to carry out data transmission from the card reader/writer to the IC card. Further, the IC card sends a reply back to the card reader/writer by the process in which a load fluctuation between terminals of the loop coil changes an impedance between antenna terminals on the IC card reader/writer side so as to change a passing current and a voltage of the antenna, for example.

The non-contact proximity communication system as typified by the IC card is easily operated and therefore widely used. For example, by storing, in the IC card, a secret identification code and other personal authentication information, value information such as an electronic ticket, a cash dispenser and a card reader/writer located at an entrance/exit of a concert hall or an entrance gate of a station may access the IC card presented by a user in a non-contact manner so as to perform an authentication process.

Recently, along with an improvement in fine technologies, an IC card having a memory space of a relatively mass storage has been developed. Such an IC card having a memory space of a relatively mass storage can store a plurality of applications (or services) at the same time so that one IC card may be employed for a plurality of uses. For example, one IC card may have various services such as electronic money for settling an electronic account, an electronic admission ticket to a specific concert hall, etc. stored therein so as to be applied to various uses.

Further, each device may be equipped with both an IC card function and a card reader/writer function so that an IC card technology may be employed as a versatile and bi-directional proximity communication interface.

For example, when the proximity communication system is constructed of devices such as a computer and an information appliance, the communication is carried out one-to-one. Further, a device may communicate with a counterpart device (referred to as a card) other than a device such as the non-contact IC card. In this case, it is possible to employ an application for carrying out one-to-many communication between one device and a plurality of cards.

In such a proximity communication system, the user physically places the devices performing the proximity communication closer to each other so that at least one device may find the other counterpart device so as to automatically start an operation. However, when a distance between the devices increases, the communication may be interrupted at any time. Therefore, there is a need for an operation guarantee mechanism which may prevent the failure of the system even if the user pulls away the devices at any timing.

Some existing proximity communication systems guarantee an operation of writing data of a given size (128 bytes, for example) by means of a function of the IC card itself. However, even in this case, when writing information data larger than the given size of data, data inconsistency may take place depending on its timing.

Specifically, in the proximity communication by means of the IC card where its commination service area is limited to the local area, it is quite probable that the communication could be interrupted. For example, the devices might be pulled away by a user's operation or a barrier could interfere with the devices. Since the IC card increases in its memory size, variations of applications/services and chances of transferring a relatively large data to the IC card increase, a problem of securing the data when the communication is suddenly stopped becomes critical.

DISCLOSURE OF THE INVENTION

An object of the present invention is to provide a superior proximity communication system in which a user physically places devices for performing the proximity communication closer to each other so that at least one device finds the other counterpart device and operates automatically.

Another object of the present invention is to provide a superior proximity communication system and a proximity communication method, a data management apparatus and a data management method, a storage medium, and a computer program in which a user physically places devices closer to each other so as to operate automatically and an operation is suitably guaranteed even if the communication between the devices is interrupted at any timing in case the user pulls away the devices from each other.

Still another object of the present invention is to provide a superior proximity communication system and a proximity communication method, a data management apparatus and a data management method, a storage medium, and a computer program in which the data consistency is suitably guaranteed if the communication between the devices is interrupted at any timing during the writing of data larger than a predetermined size.

In view of the above-mentioned problems, the present invention has been invented, and a first aspect thereof is a proximity communication system for rewriting data in response to a request from an external device in the proximity thereof, including:

a memory area having one or more data blocks for rewriting data in response to the request for rewriting data from the external device and control information provided for each of the data blocks, a data rewrite control section for controlling the rewriting of corresponding data block and its control information in response to the request from the external device for rewriting data, characterized in that the operation of rewriting data to the memory area equal to or less than an allowable rewritten data size in single transaction is guaranteed, and K pieces of control information correspond to the single transaction, and the data rewrite control section guarantees an operation of rewriting control information relating to the data block rewriting even in a situation where the proximity communication with the external device is interrupted.

In the description, "system" should be understood as an entity consisting of a plurality of devices (or functional modules realizing specific functions) which are logically assembled regardless of whether each device and functional module are in a single casing or not.

A second aspect of the present invention is a proximity communication method of rewriting data in response to a request from an external device in the proximity thereof, characterized in that a memory area includes one or more data blocks for rewriting the data in response to the request from the external device and control information provided for each of the data blocks, an operation of rewriting to the memory area equal to or less than an allowable rewritten data size in single transaction is guaranteed by the system, and K pieces of control information correspond to the single transaction, and the method includes a step for guaranteeing an operation of rewriting control information relating to data block rewriting even in a situation where the proximity communication with the external device is interrupted.

Here, the control information includes link information to a corresponding data block and link information to control information corresponding to a subsequent data block so as to indicate that the corresponding data block is in either a used state, an unused state, during-write state, or erasable state.

The memory area further includes a bootstrap including link information to a head of control information.

Still further, a data block may include link information to control information with respect to a relating data block.

When the non-contact IC card technology is employed as a transmission interface of the proximity communication system, the user physically places the devices performing the proximity communication closer to each other so that at least one device may find the other counterpart device so as to operate automatically, thus providing good operability. In contrast, when the distance between the devices is increased, the communication may be interrupted at any time so that the data consistency may be lost. Therefore, there is a need for the operation guarantee mechanism which may prevent the failure of contents of a memory even when the user pulls away the devices at any timing during writing of the data.

According to the proximity communication system of the first aspect of the present invention and the proximity communication method of the second aspect of the present invention, when a sum of control information relating to rewriting a data block is equal to or less than an allowable rewritten data size in single transaction, a rewrite operation is performed en bloc in single transaction so as to guarantee the consistency of the control information. As a result even if a rewrite operation of data block has failed, the data may be recovered based on the control information so as to prevent the system from being damaged.

According to the proximity communication system of the first aspect of the present invention and the proximity communication method of the second aspect of the present invention, when the sum of control information relating to rewriting a data block exceeds the allowable rewritten data size (namely K pieces) in single transaction, the control information is divided, in a linked order, into a plurality of groups, each of which can be rewritten in the single transaction, and write information that enables continuing performance of the following transaction in each transaction into an end control information even if the rewrite operation is interrupted.

As a result, if a rewrite of a series of control information is interrupted by a communication interruption, for example, the rewrite operation may be restarted with the interrupted position so that the consistency of the control information is guaranteed. If the rewrite operation of data block has failed due to a communication interruption, for example, the data may be recovered based on the control information so as to prevent the system from being damaged.

When rewriting data blocks linked from the bootstrap, data blocks in the unused state having capacity to be further written are searched at first. Then, control information corresponding to a head of the searched data block is changed from the unused state to the during-write state. Control information data of other data blocks are changed to the used state, and a link between respective control information is formed so as to sequencially trace a subsequent data block from the head of data block. The rewrite of the series of control information is performed by means of a guaranteed transaction so as to guarantee the consistency of the control information.

Next, the data requested to be rewritten is written into the searched data blocks by following the link formed between respective control information. Then, the control information of the head of the searched data blocks is changed from the during-write state to the used state, the control information of the head of the previous data blocks is changed from the used state to the erasable state, and in order to maintain the link from the bootstrap, the link form the bootstrap is changed to indicate the control information of the head of the searched data block. The rewrite of the series of control information is carried out in single transaction so as to guarantee the consistency of the control information.

Finally, the control information indicative of the erasable state and all of the control information linked therefrom are changed to the used state so as to set the previous data blocks reusable. The rewrite of the series of control information is carried out by the guaranteed transaction so as to guarantee the consistency of the control information.

When rewriting data blocks linked from another data block, data blocks in the unused state having capacity to be further written are searched for at first. Then, control information corresponding to a head of the searched data block is changed from the unused state to the during-write state. Control information data of other data blocks are changed to the used state, and a link between respective control information is formed so as to sequencially trace a subsequent data block from the head of data block. The rewrite of the series of control information is performed by means of the guaranteed transaction so as to guarantee the consistency of the control information.

Next, the data requested to be rewritten is written into the searched data blocks by following the link formed between respective control information. Then, in order to maintain the link from the another data block, the control information of the head of the searched data blocks is replaced with the control information of the head of the previous data blocks, and the control information of the head of the searched data blocks is changed from the during-write state to the used state, and the control information of the head of the previous data blocks is changed from the used state to the erasable state. The rewrite of the series of control information is performed by means of the guaranteed transaction so as to guarantee the consistency of the control information.

Finally, the control information indicative of the erasable state and all of the control information linked therefrom are changed to the unused state so as to set the previous data blocks reusable. The rewrite of the series of control information is carried out by the guaranteed transaction so as to guarantee the consistency of the control information.

When performing the rewrite of the series of control information by changing the control information corresponding to the head of the searched data blocks from the unused state into the during-write state, changing control information of other data blocks into the used state, and forming a link between respective control information so as to sequencially trace the data blocks from a head of data block, if the sum of control information to be rewritten exceeds the allowable rewritten data size (namely K pieces) in single transaction, the rewrite operation is carried out such that the control information may be divided, in a liked order, into a plurality of groups, each of which can be rewritten in the single transaction, in the n-th transaction, each of the links of the $\{(K-1) \times n-(K-2)\}$th to the $\{(K-1) \times n\}$th control information may indicate next control information, and the link of $\{(K-1)n+1\}$th control information may be set to 0 (or null).

As a result even if the rewrite of the series of control information is interrupted by a communication interruption, for example, an excess link is not formed so that the consistency of the control information is guaranteed. If the rewrite operation of data block has failed, the data may be recovered based on the control information so as to prevent the system from being damaged.

When performing the rewrite of the series of control information by changing the control information indicative of the erasable state and all of the control information linked therefrom into the unused state, if the sum of control information to be rewritten exceeds the allowable rewritten data size (namely, K pieces) in single transaction, the rewrite operation is carried out such that the control information may be divided, in a linked order, into a certain number of groups, each of which may be rewritten in single transaction, in the n-th write transaction, up to the $\{(K-1) \times n\}$th control information may be set to the unused state, and the $\{(K-1) \times n+1\}$th control information may be set to be erasable.

As a result, even if the rewrite of the series of control information is interrupted by a communication interruption, for example, control information in the erasable state may be searched for and the rewrite may be restarted so that the consistency of the control information is guaranteed. If the communication is interrupted, control information of a data block not to be used any longer is reliably searched for and set back in the unused state so that the memory area may be used efficiently and not wastefully.

A third aspect of the present invention is a data management apparatus for managing data in a system in which single transaction is guaranteed, characterized in that a memory area of the system is provided with one or more data blocks for writing a user data and control information for managing each data block, each control information has a fixed data size so as to allow single transaction to rewrite K pieces, and the control information is rewritten by means of the transaction whose operation of rewriting is guaranteed while the user data in the data block is rewritten.

A fourth aspect of the present invention is a data management method of managing data in a system in which single transaction is guaranteed, characterized in that a memory area of the system is provided with one or more data blocks for rewriting a user data and control information for managing each data block, each control information has a fixed data size so as to allow single transaction to rewrite K pieces, and the control information is rewritten by means of the transaction whose operation of rewriting is guaranteed while the user data in the data block is rewritten.

Here, the control information has link information to a corresponding data block and link information to control information corresponding to a subsequent data block and is constructed to indicate that the corresponding data block is in either the used state, the unused state, the during-write state, or the erasable state. Further, the memory area has a bootstrap including link information to a head of control information. Still further, a data block may include link information to control information with respect to a relating data block.

When the non-contact IC card technology is employed as a transmission interface of a rewriting data in order to rewrite the user data the memory area, if the distance between the devices is increased, the communication may be interrupted at any time so that the data consistency may be lost. Therefore, there is a need for the operation guarantee mechanism which may not damage contents of the memory even when the user pulls away the devices at any timing during writing of the data.

According to the data management apparatus of the third aspect of the present invention and the data management method of the fourth aspect of the present invention, when the sum of control information relating to rewriting a data block is equal to or less than the allowable rewritten data size in single transaction, a rewrite operation is performed en bloc in single transaction so as to guarantee the consistency of the control information. Therefore, even if a rewrite operation of data block has failed due to a communication interruption, the data may be recovered based on the control information.

Further, according to the data management apparatus of the third aspect of the present invention and the data management method of the fourth aspect of the present invention, if the sum of control information relating to rewriting the data block exceeds the allowable rewritten data size (namely, K pieces) in single transaction, the control information may be divided, in a linked order, into a plurality of groups, each of which can be rewritten in the single transaction, and write information that enables continuing performance of the following transaction in each transaction into an end of control information even if the rewrite operation is interrupted. Therefore, even if the rewrite of the series of control information is interrupted by a communication interruption etc., the rewrite may be restarted with the interrupted position so that the consistency of the control information is guaranteed.

A fifth aspect of the present invention is a storage medium having physically stored computer software, in a computer-readable format, described so as to execute a process on a computer system for rewriting data in response to a request from an external device in the proximity thereof, characterized in that a memory area includes one or more data blocks for rewriting the data in response to the request from the external device and control information provided for each of the data blocks, an operation of rewriting data to the memory area equal to or less than an allowable rewritten data size in single transaction is guaranteed by a system, and K pieces of control information correspond to single transaction, and the computer software includes a step of rewriting data to the memory area while maintaining the data consistency in the control information.

A sixth aspect of the present invention is a storage medium having physically stored computer software, in a computer-readable format, described so as to execute, on a computer system, data management in a system in which single transaction is guaranteed, characterized in that the computer software includes:

a step of providing a memory area of the system with one or more data blocks for writing a user data thereto and control information for managing each data block, and a step of rewriting the user data of the data block and rewriting the control information by means of a transaction that guarantees rewriting operation associated with the rewriting of the user data.

The storage media according to the fifth and the sixth aspects of the present invention are media for providing computer software in the computer-readable format to a general-purpose computer system capable of executing a variety of program codes, for example. Such media are removable and portable storage media such as a DVD (Digital Versatile Disc), a CD (Compact Disc), an FD (Flexible Disk), and an MO (Magneto-Optical disc), for example. Alternatively, it is technically possible to provide computer software to a specific computer system through transmission media such as a network (regardless of whether it is wireless or wired).

The storage medium according to each of the fifth and the sixth aspects of the present invention defines structural or functional cooperative relationship between given computer software and the storage medium such that the given computer software function is realized on the computer system. In other words, through the storage medium according to each of the fifth and the sixth aspects of the present invention, the given computer software is installed in the computer system so that the cooperation is achieved on the computer system so as to provide the effects similar to those from the proximity communication method according to the second aspect of the present invention or the data management method according to the fourth aspect of the present invention.

A seventh aspect of the present invention is a computer program described in a computer-readable format so as to execute, on a computer system, a process for rewriting data in response to a request from an external device in the proximity thereof, characterized in that a memory area includes one or more data blocks for rewriting the data in response to the request from the external device, and control information provided for each of the data blocks, an operation of rewriting data to the memory area equal to or less than an allowable rewritten data size in single transaction is guaranteed by a system, and K pieces of control information correspond to single transaction, and the computer program includes a step of rewriting data to the memory area while maintaining the data consistency in the control information.

A eighth aspect of the present invention is a computer program described in a computer-readable format so as to execute, on a computer system, data management in a system in which single transaction is guaranteed, characterized by comprising:

a step of providing a memory area of the system with one or more data blocks for writing a user data thereto and control information for managing each data block, and a step of rewriting the user data of the data block and rewriting the control information by means of a transaction that guarantees rewriting operation associated with the rewriting of the user data.

The computer program according to each of the seventh and the eighth aspects of the present invention defines computer program described in the computer-readable format so as to realize a predetermined process on the computer system. In other words, the computer program according to each of the seventh and the eighth aspects of the present invention is installed in the computer system so that the cooperation is achieved on the computer system so as to provide the effects similar to those from the proximity communication method according to the second aspect of the present invention or the data management method according to the fourth aspect of the present invention.

Further objects, features and advantages of the present invention will become apparent from the following more detailed description of the present embodiments of the present invention in connection with the drawings.

BRIEF DESCRIPTION OF THE DRAWINGS

FIG. 9 is a schematic representation of a data structure of a Bootstrap Service;

FIG. 10 is a schematic representation of a data structure of a TOC entry;

FIG. 11 is a diagram for explaining a procedure by which a General Description is updated;

FIG. 12 is a diagram for explaining a procedure by which the General Description is updated;

FIG. 15 is a diagram for explaining a procedure by which the Service Description is added;

BEST MODE FOR IMPLEMENTING THE INVENTION

Now, with reference to the accompanying drawings, the present embodiments of the present invention will be described.

A. Proximity Communication System

A proximity communication system according to an embodiment of the present invention allows each device to be equipped with both an IC card function and a card reader/writer function so that an IC card technology is employed as a versatile and bi-directional proximity communication interface.

For example, when the proximity communication system is comprised of equipments such as a computer and an information appliance, the communication is carried out one-to-one. Further, an equipment may communicate with a device other than the equipment such as the non-contact IC card (referred to as a card). In this case, it is possible to employ an application for carrying out one-to-many communication between one equipment and a plurality of cards.

In such a proximity communication system, the user physically places the devices performing the proximity communication closer to each other so that at least one device may find the other counterpart device so as to automatically start an operation. However, when a distance between the devices increases, the communication may be interrupted at any time. Therefore, there is a need for an operation guarantee mechanism which may prevent the failure of the system even if the user pulls away the devices at any timing. Details of the operation guarantee mechanism will be described hereafter.

In consideration of compatibility when the IC card is a communication counterpart, services provided by the proximity communication system according to the present embodiments are employed as a memory access model in which a Description is read and written basically via the proximity communication.

To this end, in the Description there are described information inherent to the device or the IC card or information of each service.

In order to realize the services, roles in starting a process and in reading/writing the Description are determined so that a variety of commands are employed among entities of different roles.

In the present embodiment, the Description is described by XML (eXtended Markup Language). XML is a page description language in which the user may define attribute information of data or a logical structure by means of a unique tag.

B. Interaction Model of Proximity Communication System

In the proximity communication system according to the present embodiment, in order to realize the services, three roles which are an Initiator, a Controller, and a Target are defined. Each device operating on the proximity communication system realizes some of these roles as needed.

Figure 1:
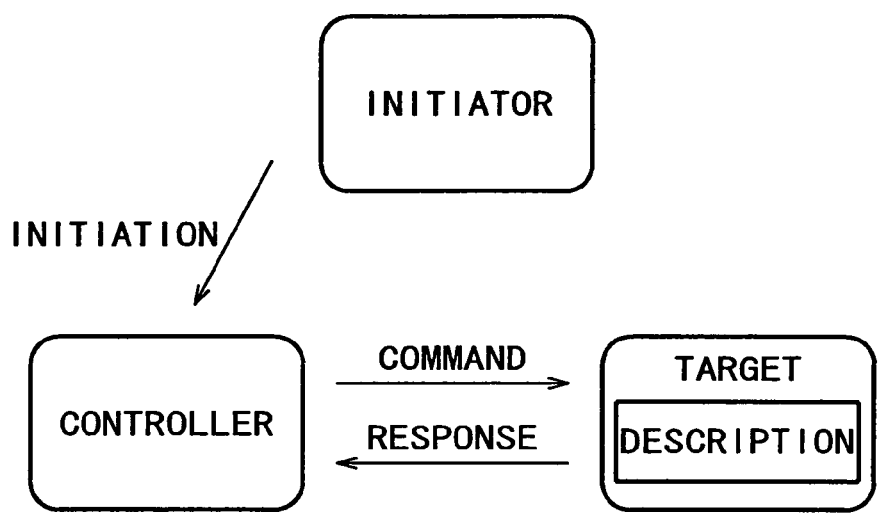
FIG. 1 is a schematic representation showing an interaction model in a proximity communication system according to an embodiment of the present invention.
Figure 2:
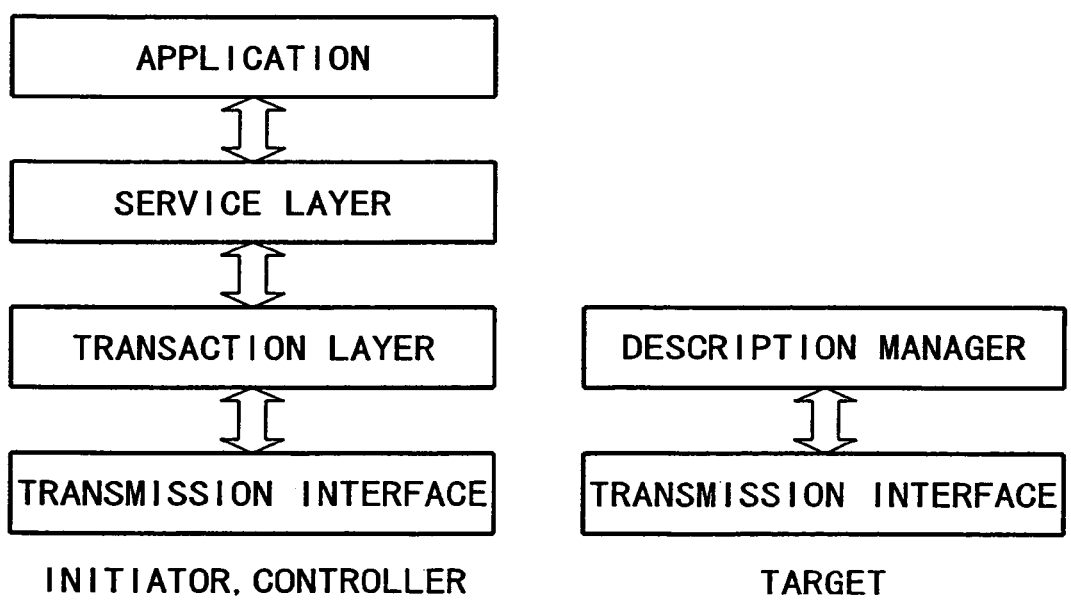
FIG. 2 is a schematic representation showing a protocol stack structure in a proximity communication system according to an embodiment of the present invention.

In FIG. 1 there is schematically shown an interaction model among the entities having respective roles in the proximity communication system according to the present embodiment.

The Initiator uses a proximity communication interface, and searches for another device in a local area so as to determine and appoint the Controller and the Target.

The device appointed as the Controller may issue a command to the Target.

In response to the command from the Controller, the Target returns a response. The Target has one or more Descriptions.

In the proximity communication system according to the present embodiment, the device, which is equipped with both the IC card function and the card reader/writer function, may be any of the Initiator, the Controller, and the Target. Whereas, the device equipped only with the IC card function may only be the Target.

Further, in the proximity communication system, the communication between the devices is subjected to the one-to-one communication, so that combinations of which entity of the Initiator, the Controller, and the Target is in which device is limited to a few when actually providing services.

Case 1

Device (Initiator+Controller) vs. Device or IC card (Target)

Case 2

Device (Initiator+Target) vs. Device (Controller)

There may be a one-to-many communication for a device vs. a card, however, the communication is considered to be of a plurality of Case 1 combinations.

Case 2 is for specific cases such as a request for a service design, a power supply, a communication route which are physical conditions. In this case, an initiation from the Initiator to the Controller is transmitted through a communication interface.

C. Description

Figure 3:
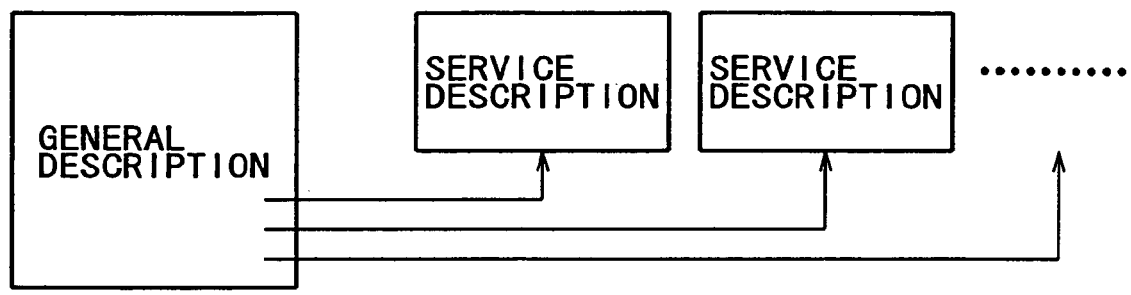
FIG. 3 is a schematic representation showing a Description structure.

The Description is referred to as information of a Target corresponding to the proximity communication system. The Descriptions employed in the present embodiment are generally classified into a General Description and a Service Description. A Target always has one General Description and a plurality of the Service Descriptions, the number of which corresponds to the number of the services. Through the General Description, the Service Description may be read (see FIG. 3)

D. Command List

The command list is shown as follows:

TABLE 1

| Name | Detail |
|---|---|
| Search | Search for Target |
| Get Title | Obtain Title |
| Set Title | Update Title |
| Get Uri | Obtain URI of relating information etc. |
| Set Uri | Update URI of relating information etc. |
| Get Icon Uri | Obtain URI of icon |
| Modify Icon | Update icon |
| Set Icon | Add icon |
| Unset Icon | Delete icon |
| Get Information List | Obtain list of URI of information |
| Get Information | Obtain information |
| Modify Information | Update information |
| Set Information | Add information |
| Unset Information | Delete information |
| Send | Issue command/response |
| Listen | Receive command/response |

Hereafter, each command is described:

(1) Search

The Search is a command aiming to obtain a connection counterpart candidate, and an ID of a retrieved Target is outputted.

(2) Stand

The Stand is a command aiming to stand as a candidate for an Initiator. Having been the Initiator, the command is successfully carried out. If the command is unsuccessful, the Initiator is not provided.

(3) Initiation

The Initiation is a command issued by the Initiator, which is instructed by transmitting an ID of a Target to a device which an Initiator intends to assign to a Controller.

(4) Get General Description

The Get General Description is a command aiming to obtain a General Description, and an XML data obtained from a Target of interest is outputted.

(5) Get Service Description

The Get Service Description is an interface aiming to obtain a Service Description. An ID of a Target of interest and a URI (Uniform Resource Identifier) of the Service Description of interest are provided as inputs so as to output the thus obtained XML data.

(6) Set General Description

The Set General Description is an interface aiming to update a General Description. An ID of a Target of interest and an XML data to be written are provided as inputs so as to store the results.

(7) Set Service Description

The Set Service Description is an interface aiming to update a Service Description. An ID of a Target of interest, a URI of a Service Description of interest, and an XML data to be written are provided as inputs so as to store the results.

(8) Add Service Description 1

The Add Service Description 1 is an interface aiming to temporarily write a Service Description. An ID of a Target of interest and an XML data of a Service Description to be written are provided as inputs so as to obtain a URI of the added Service Description as an output.

(9) Add of Service Description 2

The Add Service Description 2 is an interface aiming to add a service description (updating a General Description and validating the Service Description). An ID of a Target of interest, an XML data of the General description to be written, and a URI of the added Service Description are provided as inputs so as to store the results.

(10) Delete Service Description

The Delete Service Description is an interface aiming to delete a Service Description. An ID of a Target of interest and a URI of a Service Description of interest are provided as inputs so as to store the results.

E. Access Procedure

Hereafter, an access procedure among the devices in the proximity communication system according to the present embodiment will be described.

E-1. Determination of Initiator

The Initiator issues a Search command in order to find a subject.

In response to this, an entity received the Search command returns a response.

Figure 4:
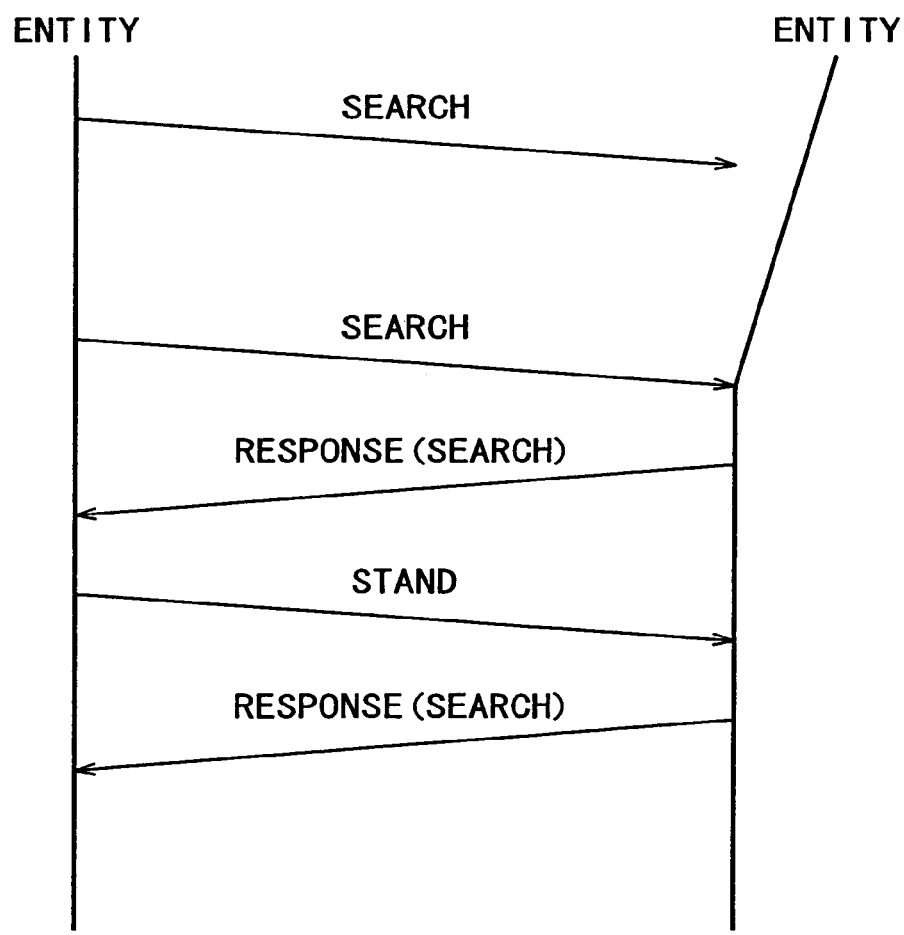
FIG. 4 is a sequence diagram showing an access procedure for determining an initiator.

Then, when another entity has a Controller function, the Initiator issues a Stand so as to determine an Initiator (see FIG. 4).

E-2. Initiator

The Initiator carries out initiation for one that is caused to have the Controller function.

Figure 5:
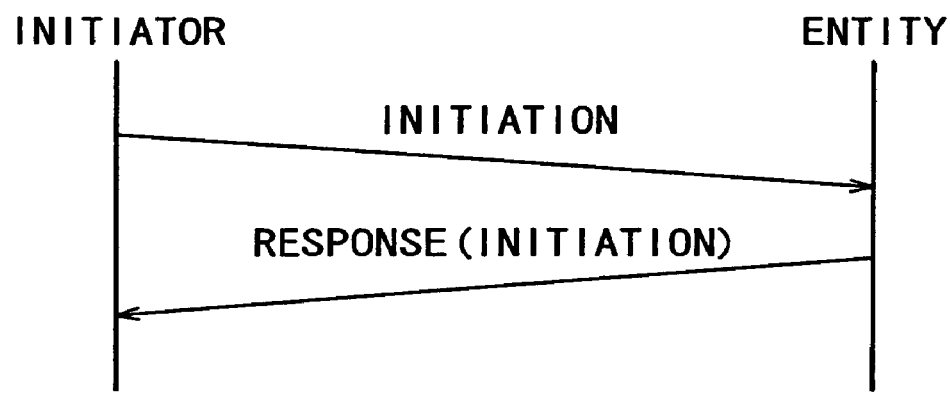
FIG. 5 is a sequence diagram showing an access procedure by which an initiator performs an initiation of a Controller.

When performing the initiation, a Controller is notified of a URI of a service desired to be used (see FIG. 5).

E-3. Controller

The Controller issues a Get General Description command to the Target notified by the Initiator so as to obtain information of the Target.

Figure 6:
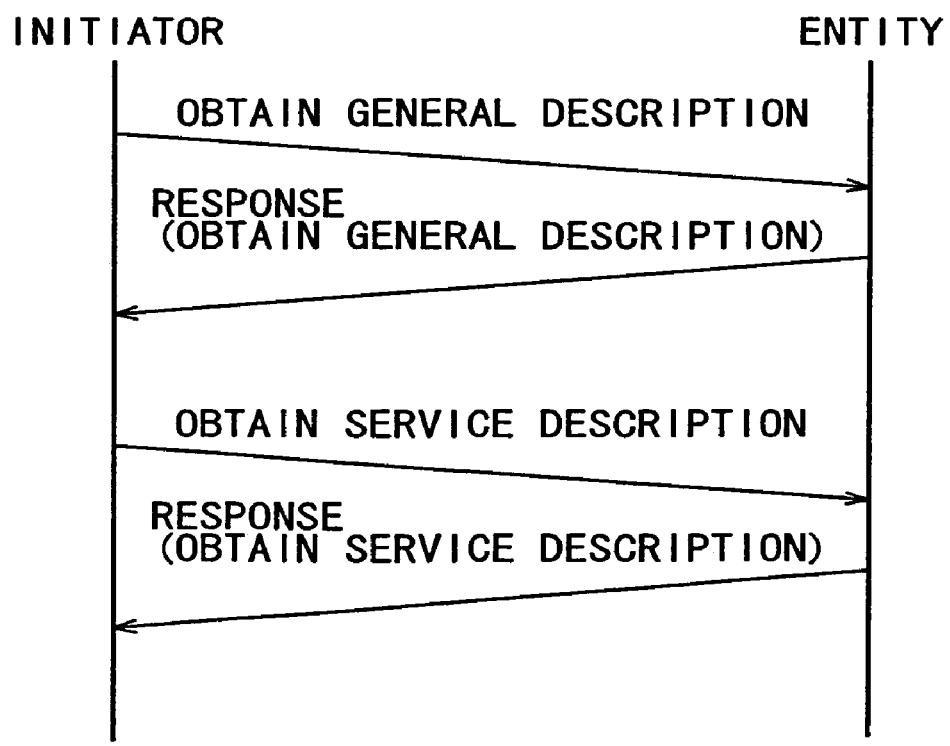
FIG. 6 is a sequence diagram showing a procedure by which a Controller accesses a target.

Further, if necessary, a Get Service Description command is issued so as to obtain a Service Description from the Target (see FIG. 6)

E-4. State Transition Diagram

Figure 7:
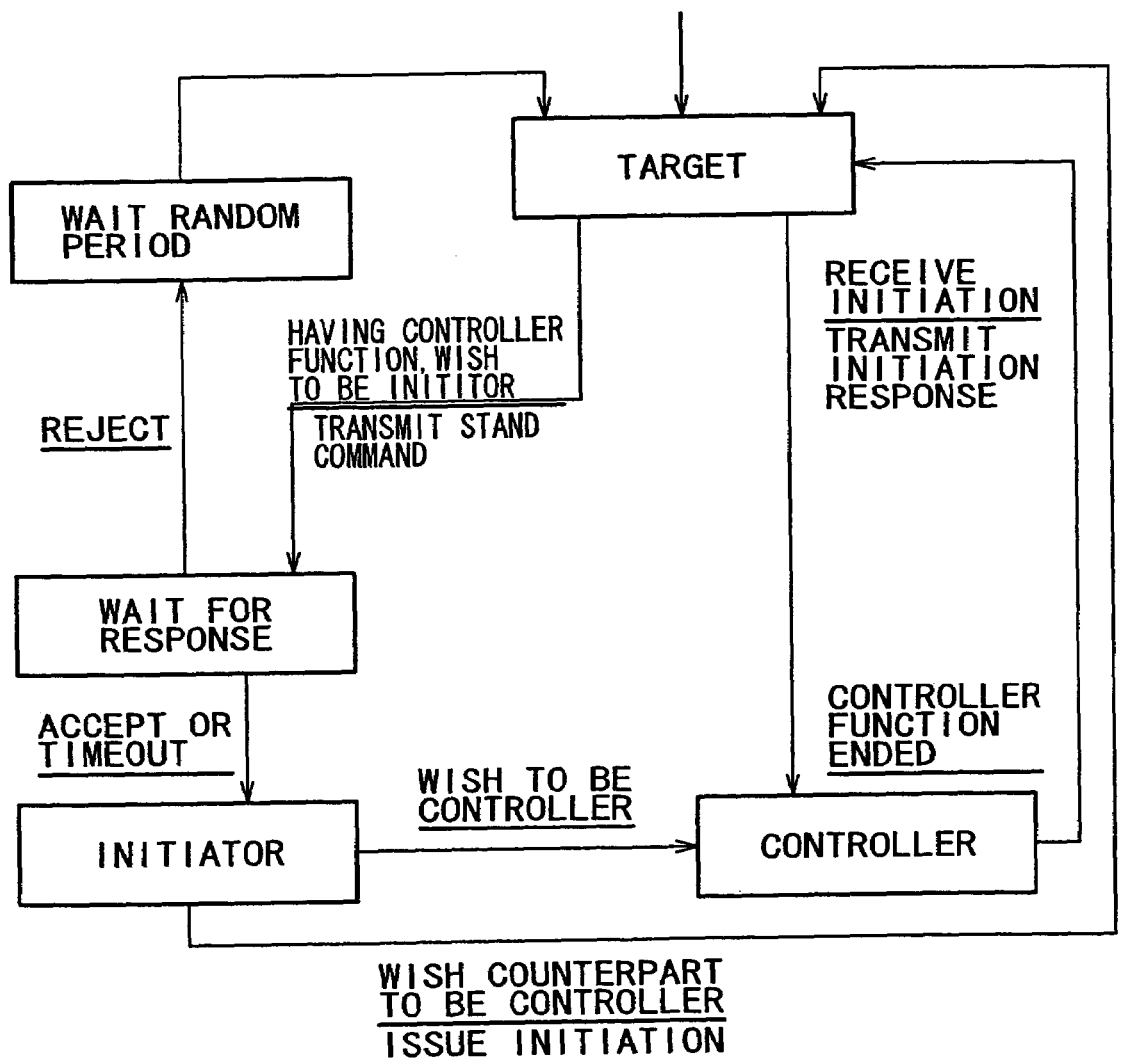
FIG. 7 is a diagram showing a state transition diagram of a device operating in a proximity communication system according to an embodiment of the present invention.

In FIG. 7 there is shown the state transition diagram of a device operating the proximity communication system according to the present embodiment.

Upon reception of the initiation, the Target returns an initiation response and changes to a Controller.

Further, the Target issues a Stand command so as to be in a stand-by state waiting for a response if it is equipped with a Controller function and wishes to be an Initiator. If it is Rejected, it returns to the Target after standing by for a random period of time. When the Stand command is received or in the case of timeout, it changes to the Initiator.

The Initiator may change to a Controller if it wishes to be the Controller. If it wishes its counterpart to be a Controller, it issues an initiation so as to change to a Target.

A Controller returns to the Target when the Controller function is ended.

F. Memory Management

As described in the paragraphs of the background art, when the non-contact IC card technology is employed as a transmission interface of the proximity communication system, the user physically places the devices performing the proximity communication closer to each other so that at least one device may find the other counterpart device so as to operate automatically. In contrast, when the distance between the devices is increased, the communication may be interrupted at any time. Therefore, there is a need for the operation guarantee mechanism which may prevent the falure of contents of a memory even when the user pulls away the devices at any timing during the writing of data.

In a non-contact IC card system to be employed for the present embodiment, a unit for reading/writing information includes 16 bytes per block, and the maximum size to be written at one time is 8 blocks (or 128 bytes). Information having a size equal to or less than the maximum may be written in single transaction, thereby guaranteeing the operation. However, information having a size greater than that is not guaranteed to be written correctly when the information is written.

Accordingly, in the present embodiment, a scheme of TOC is constructed in a memory area within the IC card, so that the TOC may be rewritten in single transaction even if information exceeds the maximum simultaneous write size. Alternatively, when two or more transactions are required, its history may be recovered so that the TOC is rewriten even if the rewrite operation is interrupted. As a result, if the card is pulled away at any timing during the writing, information within the card remains consistent so as to guarantee the correct writing operation.

F-1. Memory Space

Figure 8:
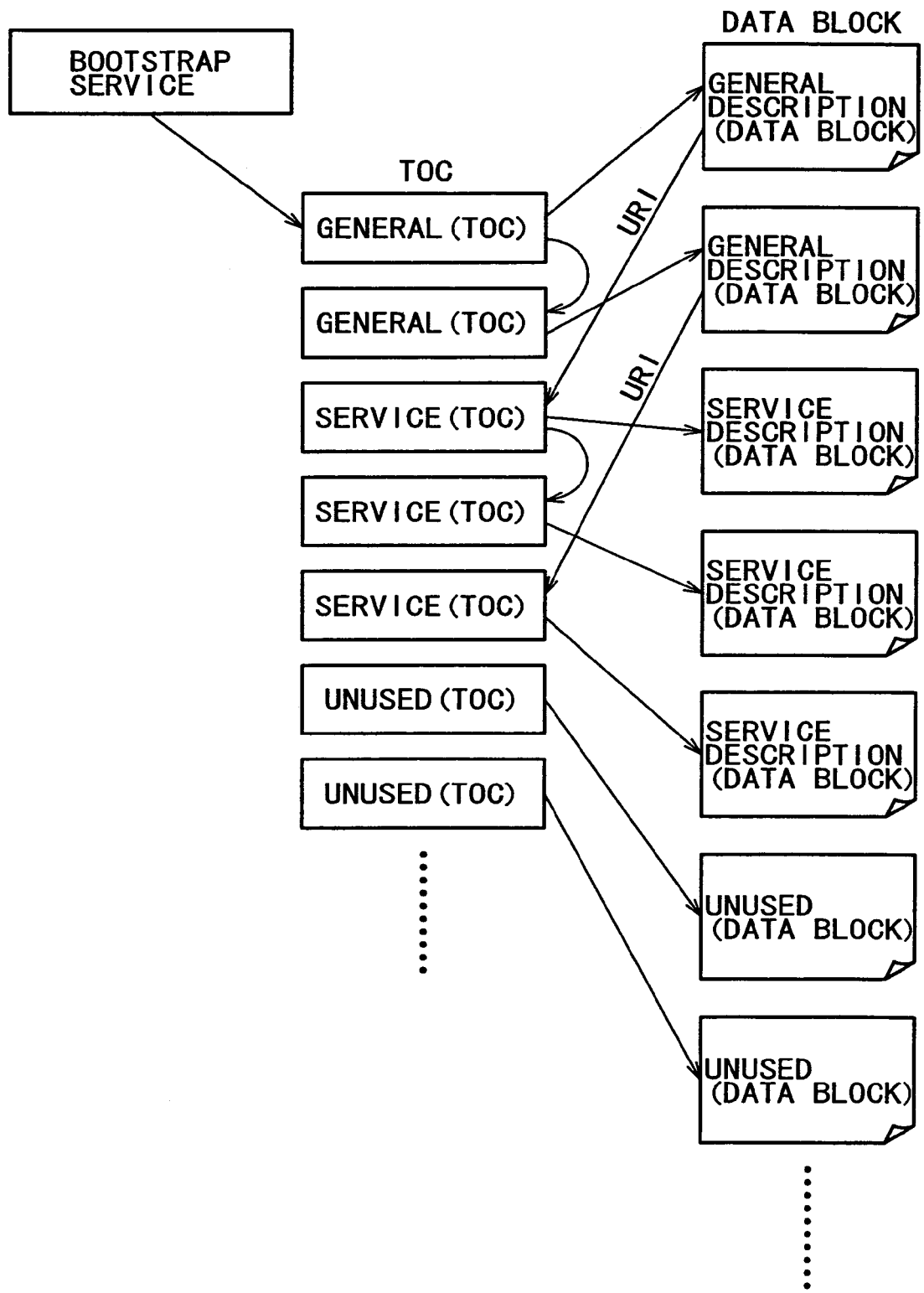
FIG. 8 is a schematic representation of a structure of a memory space in a non-contact IC card applied to a proximity communication system according to an embodiment of the present invention.

In FIG. 8 there is schematically shown a structure of a memory space in the non-contact IC card applied to the proximity communication system according to the present embodiment.

As already described, in the non-contact IC card used as a Target, the Descriptions indicative of information of the Target are maintained and managed. The Descriptions are generally classified into the General Description and the Service Description. The Target always has one General Description and Service Descriptions, the number of which equals to the number of corresponding services.

Each Description is a data body described in an XML format and written into a variable length data block or a fixed length data block.

In the present embodiment, each data area is provided with one TOC which is control information of the data. The TOC has a corresponding a Start Address of Data Block so that a desired data block is addressed based on the TOC. When the data block has a consecutive one, an Address of Next TOC is written in the TOC.

Since a Bootstrap Service provided by the non-contact IC card system is equipped with a Start Address of General Description corresponding to a head position of the TOC of the General Description, a head position of the General Description of the card may be obtained during a boot process.

Further, the General Description includes a URI which is a means for accessing the corresponding Service Description.

Therefore, as shown in FIG. 8, in the memory space in the non-contact IC card, data blocks are managed by the TOC and all the data blocks are configured to be addressed.

In FIG. 9 there is schematically shown a data structure of a Bootstrap Service. The Bootstrap Service is comprised of 16 bytes of D0 to Df.

Information indicative of whether or not the Target device has a possibility to be a Controller is written into a Media Type field.

A start address (Service Code) of the TOC of the General Description is written into a start Address of General Description field.

The number of entries of the TOC in the memory space is written into a Number of Entries field.

An address (Service Code) of the TOC of the General Description is written into a Start Address of General Description field.

Since the Bootstrap Service includes information relating to the General Description, it is necessary to rewrite the Bootstrap Service when the General Description is updated.

FIG. 10 schematically shows a data structure of a TOC entry. The TOC entry is comprised of 16 bytes of D0 to Df.

A state of the corresponding data block is described in a Type field. What is referred to as the state is defined as "Unused" indicative of an unused state, as "General" indicative of a state in use as the General Description, as "Service" indicative of a state in use as the Service Description, as "Writing" indicative of a state in writing, and as "Erasing" indicative of a state where a data block may be erased.

Into a Start Address of Data block field, a start address (Service Code) of the corresponding data block is written.

Into a Number of Blocks field, the number of blocks provided for the corresponding data block is written.

When there is a corresponding Description or a subsequent data block, a start address (Service Code) of next TOC is written into an Address of Next TOC field.

Into a Data Size field, a data size written into the corresponding data block is written.

F-2. Obtain General Description

By reading the Start Address of General Description included in the Bootstrap Service, a head address of the TOC (Table Of Contents) which is control information of the General Description is found. By reading the TOC of the General Description, the Type, the Start Address of Data Block, the Number of Blocks, and the Address of Next TOC can be found. When the TYPE indicates the General Description, the information is valid.

A data is recorded in blocks by the Number of Blocks from an address indicated by the Start Address of Data Block. Further, if there is subsequent one, next TOC address goes into the Address of Next TOC. If a value is zero (0), the process terminates at the TOC.

F-3. Obtain Service Description

A designating URI represents an address of the TOC of the Service Description. By reading its area, the Type, the Start Address of Data Block, the Number of Block, and the Address of Next TOC may be found. When the Type represents the Service Description, information is valid.

A data is recorded in blocks by the Number of Blocks from an address indicated by the Start Address of Data Block. Further, if there is subsequent one, next TOC address goes into the Address of Next TOC. If a value is zero (0), the process terminates at the TOC.

F-4. Update General Description

A procedure of updating the General Description while guaranteeing the data consistency even in a situation where communication is interrupted during the writing will be described with reference to FIG. 11 and FIG. 12.

However, FIG. 11 shows the case where the General Description uses only one data block, FIG. 12 shows the case where the General Description extends across two or more data blocks.

(1) At first, an unused data block is searched for in the memory space so as to confirm that there is sufficient capacity to write a new General Description (see FIG. 11). When the General Description extends across two or more data blocks, the corresponding number of unused data blocks are searched for (see FIG. 12).

The search process for the unused data blocks is realized by searching a TOC whose Type field is set to Unused and by referring to the Number of Blocks.

Further, it is confirmed that the located data block provides free capacity greater than the size of the new General Description after updating. The confirmation is carried out to avoid further update from being disabled after updating the General Description.

(2) Next, in order to allocate the data block to a rewrite destination of the General Description, the Type of TOC of a data block desired to be used is changed from Unused (not used) to Writing (during-write) and at the same time other parameters are set (see FIG. 11).

Further, when the General Description extends across two or more data blocks, a Type of a headmost TOC is changed from Unused to Writing and a Type of other TOC is changed to General and at the same time other parameters are set. When a plurality of areas are included, the parameters are set so as to follow next TOC sequencially (see FIG. 12).

The rewrite operation of the TOC here is carried out in single transaction. In single transaction, the data consistency of the TOC is maintained because writing in the non-contact IC card is guaranteed. If the communication is interrupted during the writing the following data block, it is recovered based on the TOC.

Note that if single transaction does not complete a rewrite operation of all the TOC's because the General Description extends across a plurality of (nine or more) data blocks, then the TOC's are rewritten so as to recover the history even if the rewrite operation is interrupted, which will be described later.

(3) Then, contents of the new General Description is written into the data block as allocated in the above process (1).

The General Description is described in the XML format (as mentioned above), however, its data size is so large in capacity as to exceed the maximum simultaneous write size, a write of which is usually guaranteed in a non-contact IC card. Thus, if the devices are pulled away at any timing in the case of writing the General Description, the communication may be interrupted to destroy the contents of the data. However, the communication history may be traced based on the TOC so as to recover the data.

(4) Then, the Type of the TOC of the data block lately written is changed from Writing (during-write) to General by updating, and the Type of the TOC of the previous General Description is changed to Erasing (erasable). At the same time, a parameter indicative of General for a Bootstrap is updated to indicate the TOC of the new General Description (see FIG. 11).

Further, when the General Description extends across two or more data blocks, the headmost TOC is updated from Writing (during-write) to be General.

The Type of the headmost TOC of the previous General Description is updated to be Erasing (erasable). At the same time, a parameter indicative of General for the Bootstrap is updated to indicate the TOC of the new General Description (see FIG. 12).

The rewrite operation of the TOC here is carried out in single transaction. In single transaction, the data consistency of the TOC is maintained because writing in the non-contact IC card is guaranteed. In this case, the new and old TOC are rewritten at the same time, so that the General Description does not suffer from a communication interruption. Note that if single transaction does not complete a rewrite operation of all the TOC's because the General Description extends across a plurality of (nine or more) data blocks, then the TOC's are rewritten so as to recover the history even if the rewrite operation is interrupted (the same as above).

(5) Finally, all the Types of the TOC whose Type is Erasing (erasable) and other TOC's to be traced by means of the former are set to Unused (not used) (see FIG. 11 and FIG. 12). By returning them to Unused (not used), data blocks corresponding to these TOC's become available again.

F-5. Update Service Description

A procedure of updating the Service Description while guaranteeing the data consistency even in a situation where communication is interrupted during the writing will be described with reference to FIG. 13 and FIG. 14. However, FIG. 13 shows the case where the Service Description uses only one data block, FIG. 14 shows the case where the Service Description extends across two or more data blocks.

Figure 13:
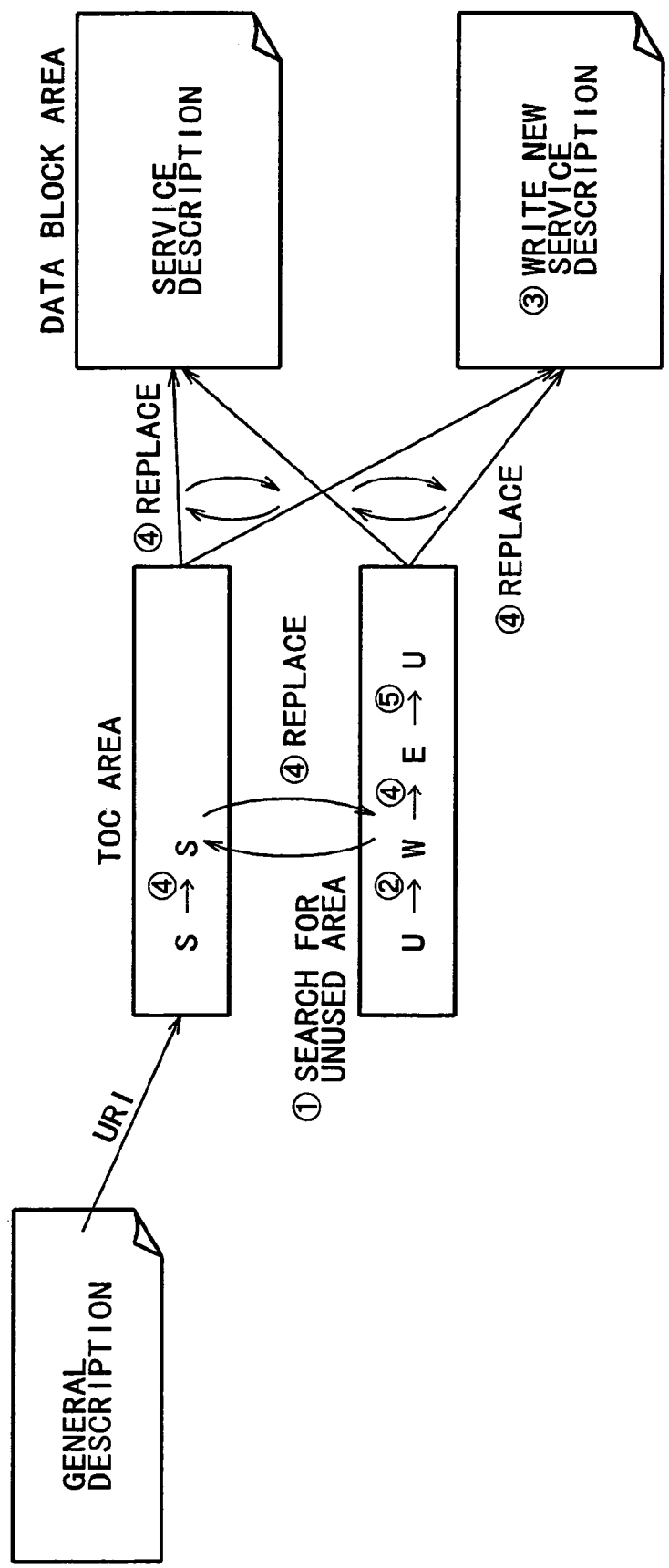
FIG. 13 is a diagram for explaining a procedure by which a Service Description is updated.
Figure 14:
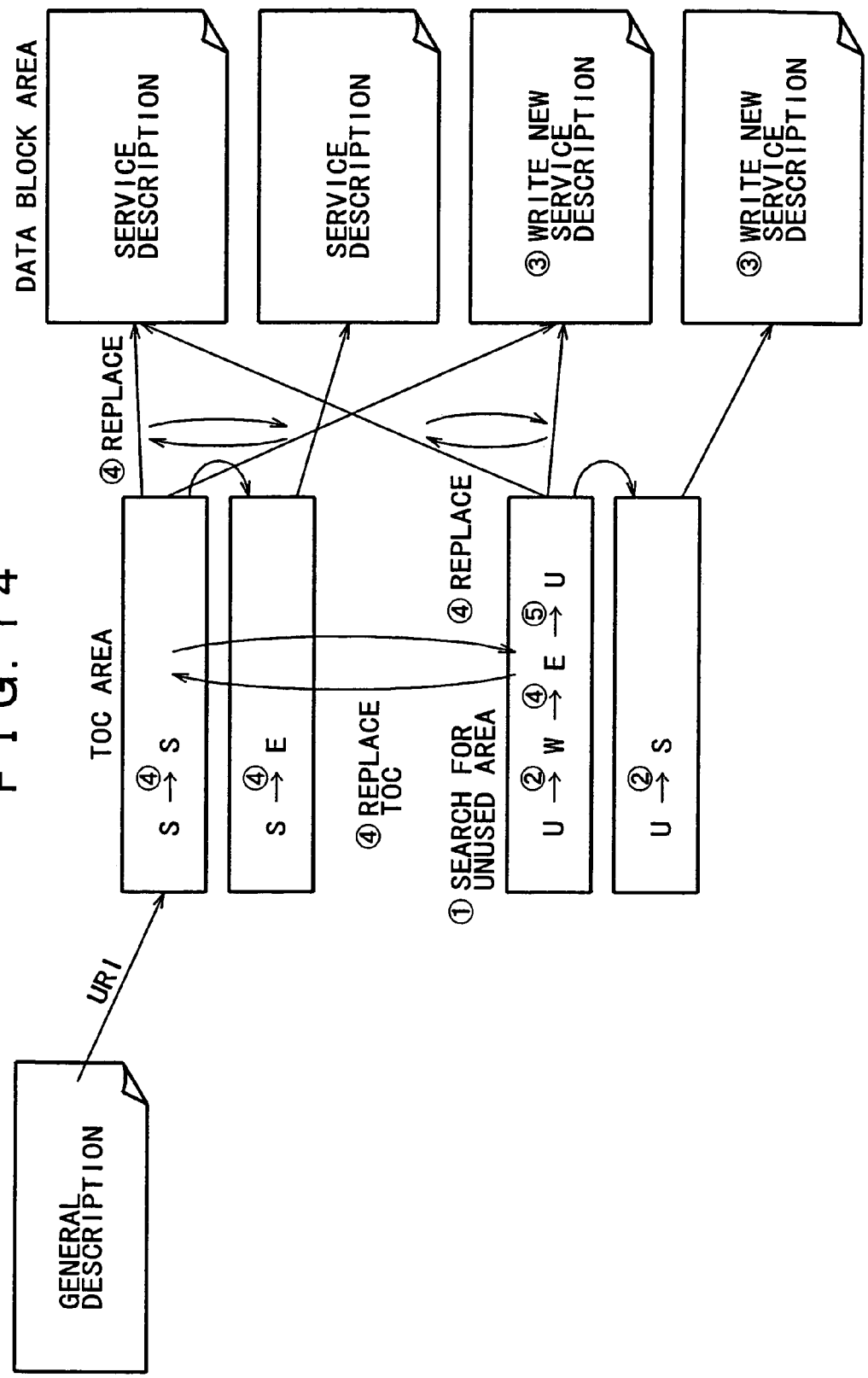
FIG. 14 is a diagram for explaining a procedure by which the Service Description is updated.

(1) At first, an unused data block is searched for in the memory space so as to confirm that there is sufficient capacity to write a new Service Description (see FIG. 13). When the Service Description extends across two or more data blocks, the corresponding number of unused data blocks are searched for (see FIG. 14).

The search process for the unused data blocks is realized by searching a TOC whose Type field is set to Unused (not used) and by referring to the Number of Blocks.

Further, it is confirmed that the located data block provides free capacity greater than the size of the new General Description after updating. The confirmation is carried out to avoid further update from being disabled after updating the General Description.

(2) Next, in order to allocate the data block to a rewrite destination of the Service Description, the Type of TOC of a data block desired to be used is changed from Unused (not used) to Writing (during-write) and at the same time other parameters are set (see FIG. 13).

Further, when the Service Description extends across two or more data blocks, a Type of the headmost TOC is changed from Unused (not used) to Writing (during-write) and a Type of other than the headmost TOC is changed to Service and at the same time other parameters are set. When a plurality of areas are included, the parameters are set so as to follow next TOC sequencially (see FIG. 14).

Since the rewrite operation of the TOC here is carried out in single transaction, the data consistency of the TOC is maintained. If the communication is interrupted during the writing the following data block, it is recovered based on the TOC. Note that if single transaction does not complete a rewrite operation of all the TOC's because the Service Description extends across a plurality of (nine or more) data blocks, then the TOC's are rewritten so as to recover the history even if the rewrite operation is interrupted.

(3) Then, contents of the new Service Description is written into the data block as allocated in the above process (1).

The Service Description is described in the XML format (as mentioned above), however, its data size is so large in capacity as to exceed the maximum simultaneous write size, a write of which is usually guaranteed in a non-contact IC card. Thus, if the devices are pulled away at any timing in the case of writing the General Description, the communication may be interrupted to destroy the contents of the data. However, the communication history may be traced based on the TOC so as to recover the data.

(4) Then, the information of the TOC of the data block lately written is replaced with the information of the TOC of the previous Service Description, and at the same time a Type of the TOC of the new Service Description is changed from Writing (during-write) to Service by updating, and the Type of the TOC of the previous Service Description is is changed to Erasing (erasable) (see FIG. 13).

Further, when the Service Description extends across two or more data blocks, the information of the headmost TOC of the Service Description is replaced with the information of the headmost TOC of the previous Service Description, and a Type of the TOC of the new Service Description is changed from Writing (during-write) to Service by updating, and at the same time the Type of the TOC of the previous Service Description is changed to Erasing (erasable) (see FIG. 14).

The General Description refers to the TOC of the Service Description by means of a URI. In order to avoid rewrite the General Description every time the Service Description is updated, a new Service Description is written then the new and old TOC's are exchanged so as not to change the reference to the TOC.

The rewrite operation of the TOC here is carried out in single transaction. In the single transaction, the data consistency of the TOC is maintained because writing in the non-contact IC card is guaranteed. In this case, the new and old TOC are replaced with each other at the same time, so that the General Description does not suffer from a communication interruption. It should be noted that if single transaction does not complete a rewrite operation of all the TOC's because the General Description extends across a plurality of (nine or more) data blocks, then the TOC's are rewritten so as to recover the history even if the rewrite operation is interrupted (the same as above).

(5) Finally, all the Types of the TOC whose Type is Erasing (erasable) and other TOC's to be traced by means of the former are set to Unused (not used) (see FIG. 13 and FIG. 14). By returning them to Unused (not used), data blocks corresponding to these TOC's become available again.

F-6. Addition of Service Description

A procedure for adding the Service Description while guaranteeing the data consistency even in a situation where communication is interrupted during the writing will be described with reference to FIG. 15.

(1) At first, an unused data block is searched for in a memory space number so as to confirm that there is sufficient capacity to write a new Service Description and a General Description.

Further, it is confirmed that free capacity as large as the size of the new General Description is, provided after updating. The confirmation is carried out so as not to disable further updating after the addition of the Service Description.

(2) Next, in order to allocate an area desired to be used by the new Service Description, a Type of the headmost TOC of desired areas is changed from Unused (not used) to Writing (during-write) and Types other than the headmost TOC are changed to Service and at the same time other parameters are set. When a plurality of areas are included, next TOC may be traced.

Since the rewrite operation of the TOC here is carried out in single transaction, the data consistency of the TOC is maintained. If the communication is interrupted during the writing the subsequent data block, it is recovered based on the TOC. Note that if single transaction does not complete a rewrite operation of all the TOC's because the Service Description extends across a plurality of (nine or more) data blocks, then the TOC's are rewritten so as to recover the history even if the rewrite operation is interrupted.

(3) Then, contents of the new Service Description is written into each data block as allocated in the above process (1).

The Service Description is described in the XML format (as mentioned above), however, its data size is so large in capacity as to exceed the maximum simultaneous write size which is guaranteed to write into the non-contact IC card. Thus, if the devices are pulled away at any timing in the case of writing the General Description, the communication may be interrupted to destroy the contents of the data. However, the communication history may be traced based on the TOC so as to recover the data.

(4) Then, according to the following procedure a Service is added to the General Description.

(4-1) An unused data block for preparing a new General Description having added a Service thereto is searched for.

(4-2) Next, in order to allocate the data block to a rewrite destination of the General Description, a Type of a headmost TOC of data blocks desired to be used is changed from Unused (not used) to Writing (during-write) and a Type other than the headmost TOC is changed to General and at the same time other parameters are set. When a plurality of data blocks are included, next TOC may be traced.

The rewrite operation of the TOC here is carried out in single transaction so that the data consistency of the TOC is maintained. If the communication is interrupted during the writing the subsequent data block, it is recovered based on the TOC. Note that if single transaction does not complete a rewrite operation of all the TOC's because the General Description extends across a plurality of (nine or more) data blocks, then the TOC's are rewritten so as to recover the history even if the rewrite operation is interrupted.

(4-3) Contents of the new General Description are written into each of the allocated data blocks.

Since the General Description is so large in capacity as to exceed the maximum simultaneous write size which is guaranteed to write into the non-contact IC card, the communication may be interrupted to destroy the contents of the data if the devices are pulled away at any timing in the case of writing the General Description. However, the communication history may be traced based on the TOC so as to recover the data.

(4-4) The Type of the headmost TOC of the data block lately written is changed from Writing (during-write) to General by updating, and the Type of the headmost TOC of the previous General Description is changed to Erasing (erasable) and a parameter indicative of General for a Bootstrap is updated to indicate the TOC of the new General Description. At the same time the Type of the headmost TOC of the lately added Service is changed from Writing (during-write) to Service by updating.

Since the rewrite operation of the TOC here is carried out in single transaction, the data consistency of the TOC is maintained. In this case, the new and old TOC are rewritten at the same time, so that it does not suffer from a communication interruption. Note that if single transaction does not complete a rewrite operation of all the TOC's because the Description to be rewritten extends across a plurality of (nine or more) data blocks, then the TOC's are rewritten so as to recover the history even if the rewrite operation is interrupted (the same as above).

(5) Finally, all the Types of the TOC whose Type is Erasing (erasable) and other TOC's to be traced by means of the former are set to Unused (not used). By returning them to Unused (not used), data blocks corresponding to these TOC's become available again.

The above-described addition process of the Service Description is realized by a combination of procedures of the updating of the Service Description and the rewrite of the General Description.

F-7. Deletion of Service Description

Figure 16:
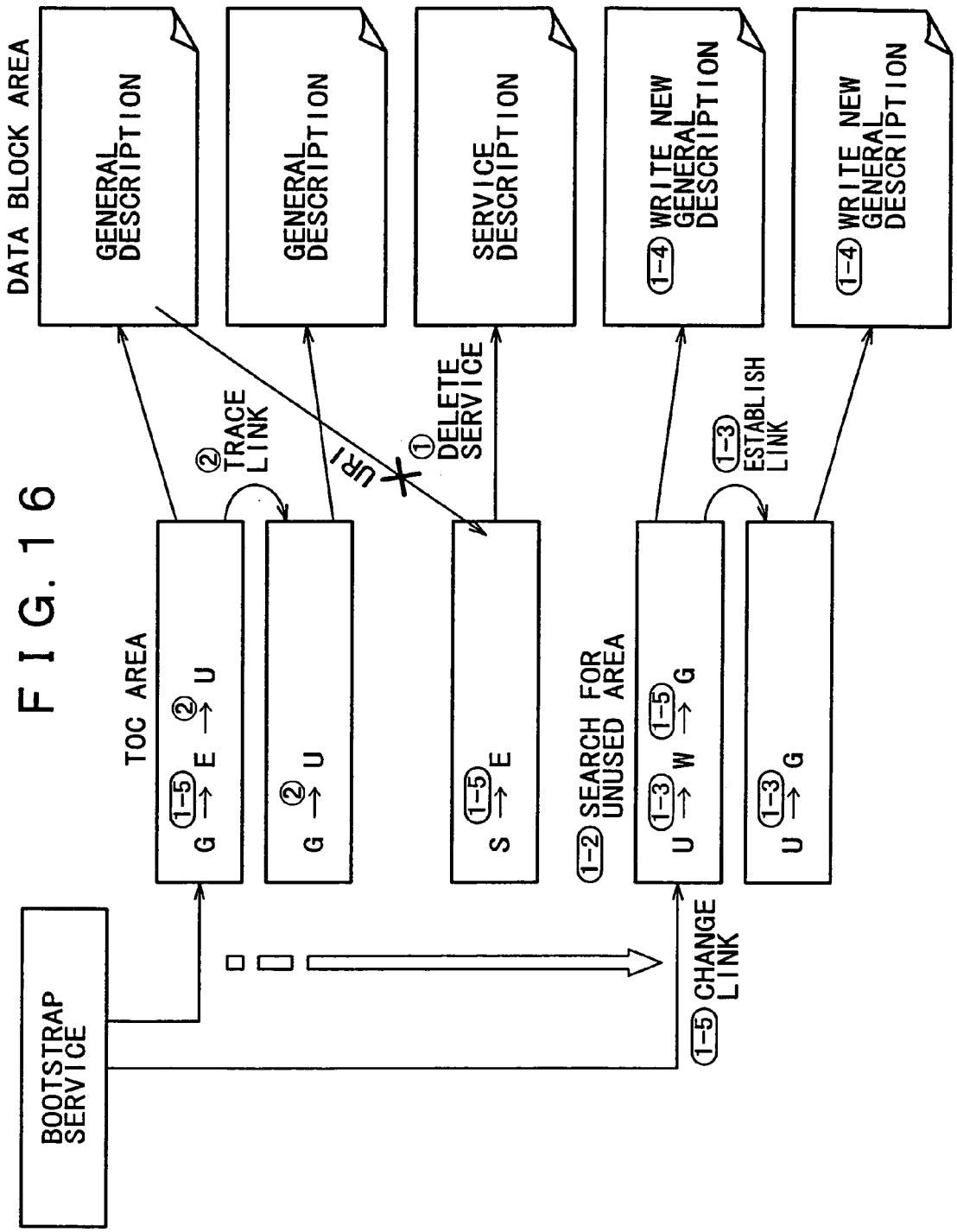
FIG. 16 is a diagram for explaining a procedure by which the Service Description is deleted.

A procedure of deleting the Service Description while guaranteeing the data consistency even in a situation where communication is interrupted during the writing will be described with reference to FIG. 16.

(1) According to the following procedure a Service is deleted from the General Description.

(1-1) A new General Description having deleted the Service therefrom is prepared.

(1-2) An unused data block is searched for in a memory space number so as to confirm that there is sufficient capacity to write the new General Description.

Further, it is confirmed that free capacity as large as the size of the new General Description is provided after updating. The confirmation is carried out to avoid further update from being disabled after updating the General Description.

(1-3) Next, in order to allocate a data block a Type of a headmost TOC of data blocks desired to be used is changed from Unused (not used) to Writing (during-write) and Types other than the headmost TOC are changed to General and at the same time other parameters are set. When a plurality of data blocks are included, next TOC may be traced.

By carrying out the rewrite operation of the TOC here in single transaction, the data consistency of the TOC is maintained. If the communication is interrupted during the writing the subsequent data block, it is recovered based on the TOC. Note that if single transaction does not complete a rewrite operation of all the TOC's because the General Description extends across a plurality of (nine or more) data blocks, then the TOC's are rewritten so as to recover the history even if the rewrite operation is interrupted.

(1-4) Contents of the new General Description is written into each of the allocated data blocks.

Since the General Description is so large in capacity as to exceed the maximum simultaneous write size which is guaranteed to write into the non-contact IC card, the communication may be interrupted to destroy the contents of the data if the devices are pulled away at any timing in the case of writing the General Description. However, the communication history may be traced based on the TOC so as to recover the data.

(1-5) The Type of the headmost TOC of the new data block is changed from Writing (during-write) to General by updating, and the Type of the headmost TOC of the previous General Description is changed to Erasing (erasable) and a parameter indicative of General for a Bootstrap Service is updated to indicate the TOC of the new General Description. At the same time the Type of the TOC of the data block to be deleted is changed from Service to Erasing (erasable) by updating.

Since the rewrite operation of the TOC here is carried out in single transaction, the data consistency of the TOC is maintained. In this case, the new and old TOC are rewritten at the same time, so that it does not suffer from a communication interruption. Note that if single transaction does not complete a rewrite operation of all the TOC's because the Description to be rewritten extends across a plurality of (nine or more) data blocks, then the TOC's are rewritten so as to recover the history even if the rewrite operation is interrupted (the same as above).

(2) Finally, all the Types of the TOC whose Type is Erasing (erasable) and other TOC's to be traced by means of the former are set to Unused (not used). By returning them to Unused (not used), data blocks corresponding to these TOC's become available again.

The above-described deletion process of the Service Description is realized by a procedure of the updating of the General Description, that is, basically a link from the corresponding General Description to the Service Description is deleted.

F-8. Rewriting Procedure When Changing Type of TOC's To Writing

When the non-contact IC card is applied to a transmission interface of the proximity communication system according to the present embodiment, a unit for reading/writing information includes 16 bytes per block and the maximum size to be written at the same time is 8 blocks (or 128 bytes). With that size, Writing of information is guaranteed. Then, when the data or the Description is updated, added, deleted, rewritings of the TOC's associated with all of these procedures may be performed in single transaction so as to guarantee the data.

However, the TOC includes 16 bytes or one block so that it is not possible to rewrite all TOC's in single transaction when the update, the addition, the deletion of the Description are carried out over a plurality of data blocks and the number of TOC's to be updated is equal to or greater than nine.

Thus, in the present embodiment, when the rewrite of the TOC extends across two or more transactions, the rewrite of the TOC is carried out to rewrite the TOC so as to recover the history in case of an interrupted communication. As a result, if the card is pulled away at any timing in Writing, information within the card remains consistent so as to guarantee a correct writing operation.

As described above, when updating, adding, deleting the Description which extends across the plurality of data blocks, the Type of the headmost TOC is set to Writing (during-write) and a Type of TOC's other than the headmost TOC is set to General (or Service).

When there are nine or more TOC's to be updated, they are separated into write operations for eight blocks each. In the n-th write (here n is an integer equal to one or more), each Address of Next TOC of the (7n−6)th to the 7n-th TOC is set to indicate the next TOC, an Address of Next TOC of the (7n+1)th TOC is set to 0 (null). Then, when writing through the (7n+1)th TOC next time, a correct address is written.

In this way, for each TOC rewriting transaction, an end TOC is left to stand without appointing the next TOC, so that an unnecessary designation of TOC may be avoided if the transaction fails due to a communication interruption.

On the other hand, when the end TOC appoints the next TOC, if the transaction fails, then a Type of the next TOC is Unused (not used), so that the link of the TOC remains after an irrelevant data is written by another transaction, which may cause inconsistency in data.

Figure 17:
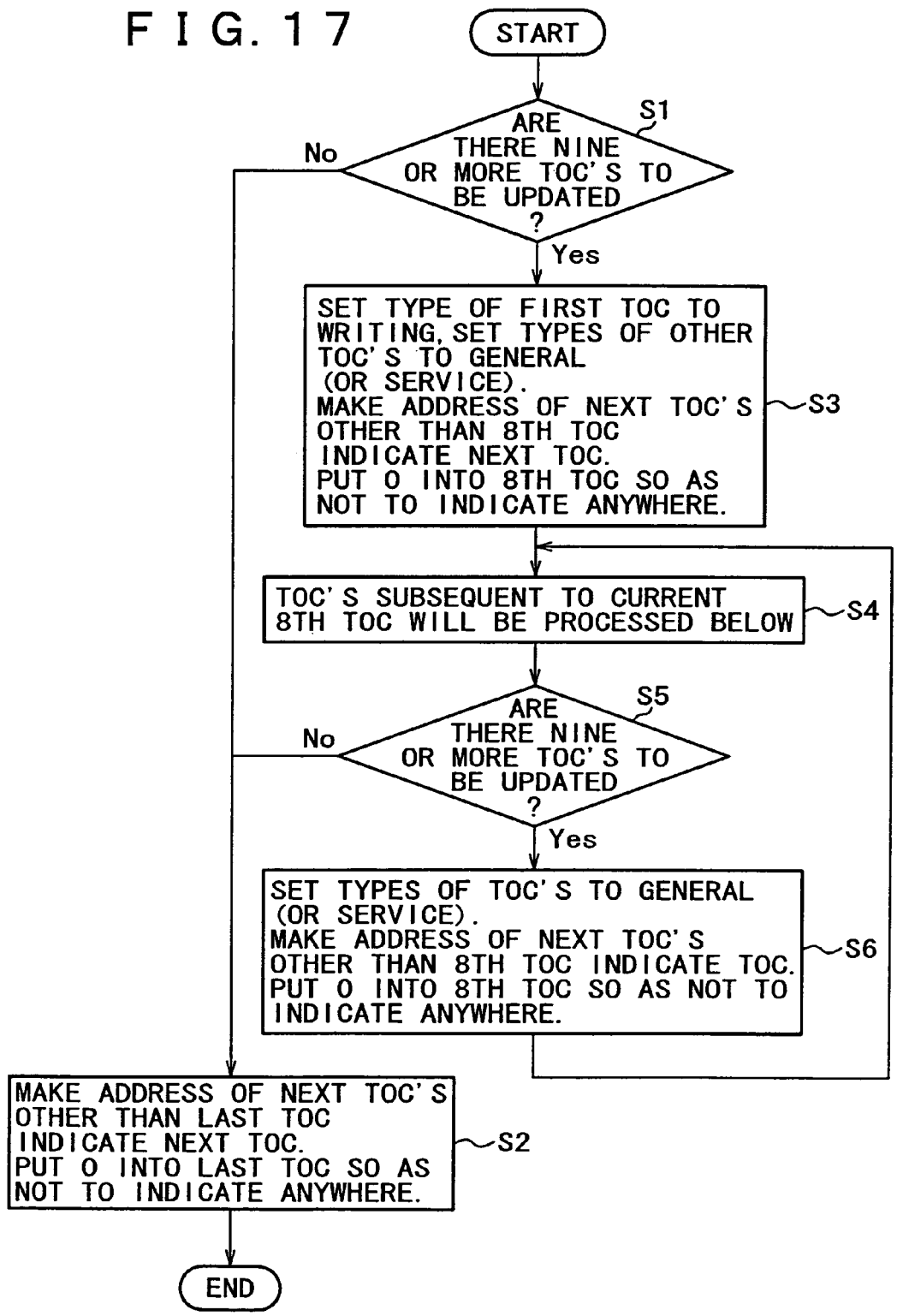
FIG. 17 is a flow chart showing a rewriting procedure when setting a TOC group to be a Writing.
Figure 18:
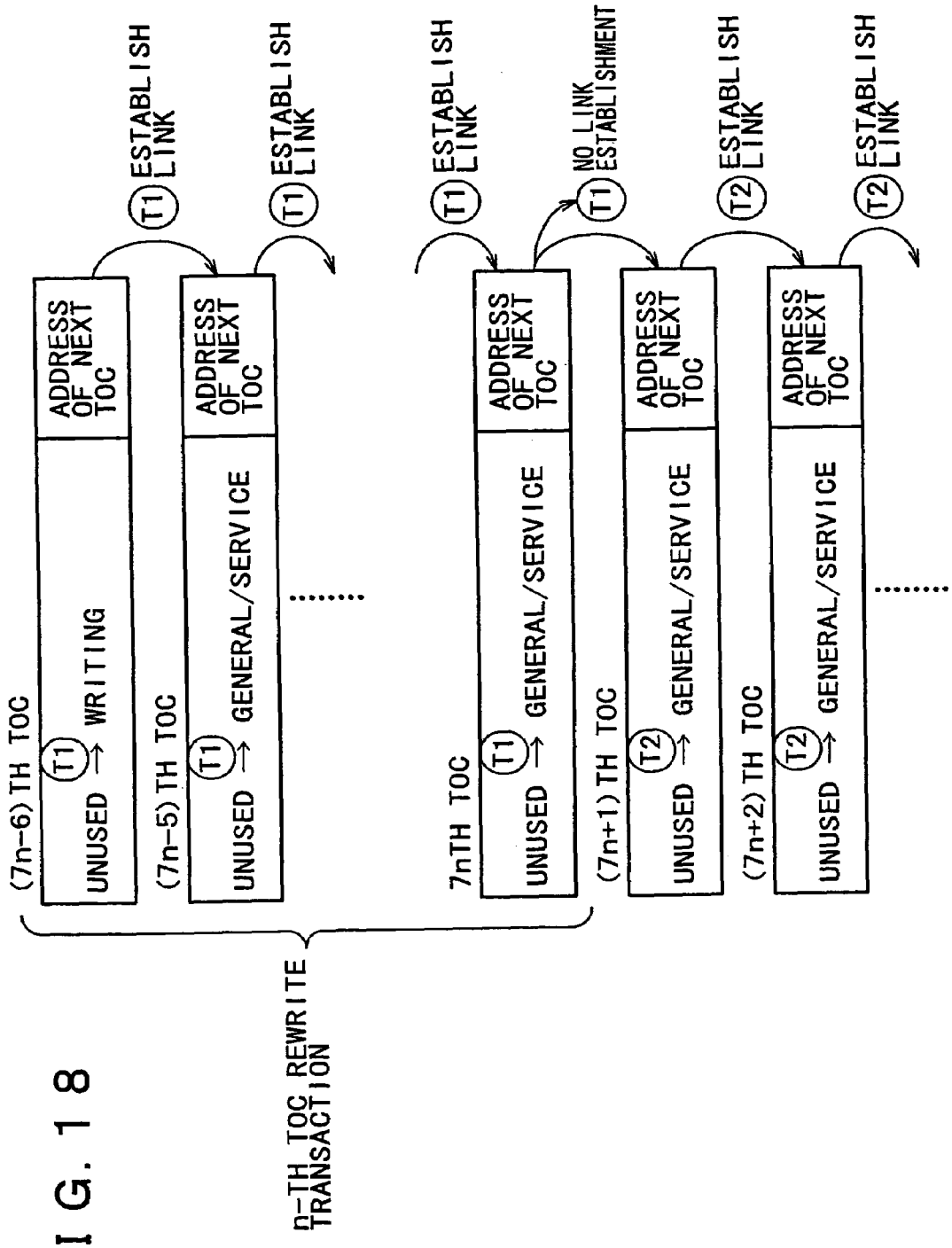
FIG. 18 is a flow chart showing a operation for each TOC when setting the TOC group to be the Writing.

FIG. 17 shows a rewriting procedure in a flow chart when setting a TOC group to be a Writing (during-write). FIG. 18 illustrates operation for each TOC at this time.

At first it is determined whether or not the number of TOC's to be updated is nine or more, that is, if single transaction may not complete the update of all the TOC's (step S1).

When the number of the TOC's to be updated is equal to or less than eight that is single transaction can complete the update of all the TOC's, each Address of Next TOC except for the last TOC caused to appoint the next TOC and the last TOC is replaced with 0 (null) in order for the last TOC not to appoint any (step S2). The rewrite operation for the TOC's is carried out by only single transaction.

On the other hand, when the number of the TOC's to be updated is nine or more, the Type of the first TOC is set to Writing (during-write) and the Types of other TOC's are set to General (or Service). A start Address of Next TOC except the eighth TOC is set to indicate next TOC, and the eighth TOC is replaced with 0 so as not to indicate any (step S3). The rewrite operation for the TOC's is carried out by only single transaction (T1).

Hereafter, the TOC's after the eighth at present are processed (step S4).

It is determined if there are nine or more TOC's to be updated left, that is, if single transaction may not update the updating of all the TOC's (step S5).

When the number of the TOC's to be updated is equal to or less than eight that is single transaction can complete the update of all the TOC's, each Address of Next TOC except for the last TOC caused to appoint the next TOC and the last TOC is replaced with 0 (null) in order for the last TOC not to appoint any (step S2).

On the other hand, when the number of the TOC's to be updated is nine or more, the Type of the current TOC is set to Writing (during-write) and the Types of other TOC's are set to General (or Service). An Address of Next TOC except the eighth TOC is set to indicate next TOC, and the eighth TOC is replaced with 0 so as not to indicate any (step S6). The rewrite operation for the TOC's is carried out by only single transaction (T2).

Then the process returns to step S4 and repeats a write operation of the TOC similar to the above until all the TOC's are finished processing.

F-9. Garbage Collection

When the non-contact IC card is applied to the transmission interface of the proximity communication system according to the present embodiment, in order to update, add, delete the data or the Description, data is written into a new data block which then replaces the old data block.

In order to guarantee the data in case of a communication interruption during the rewriting of the data, the Types of the TOC's of the new and old data blocks are updated sequencially according to the progress of a data rewrite procedure. In other words, the Type of TOC of the new data block changes from Unused (not used) through Writing (writing) to General or Service (in the case of the headmost TOC). Further, the Type of the TOC of the original data block changes from General or Service to Erasing (erasable) (in the case of the headmost TOC).

As described above, until the rewrite operation for the data is successfully is terminated, an intermediate state such as Writing (during-write) and Erasing (erasable) as a Type of the TOC is provided so that a data block having failed in writing may be traced and specified following a link of the TOC even if the communication is interrupted during a transaction.

A data block whose Type of TOC is Writing (during-write) or Erasing (erasable) indicates that it is not available because of a communication interruption etc. Thus, it may be released to be used again. In other words, TOC's which may be traced from TOC whose Type is Writing (during-write) or Erasing (erasable) are set to Unused. Such process of reserving unused data blocks is referred to as Garbage Collection in the present specification.

If the data write operation has not been successfully completed because of an interrupted communication etc. during update, addition, deletion of the data block, the Type of the headmost TOC is Writing (during-write) or Erasing (erasable), and Types of TOC's other than the headmost TOC are General or Service (see FIG. 12, FIG. 14, FIG. 15, and FIG. 16). All of them are object of the Garbage Collection and changed to Unused (not used) so as to reuse the data block.

As to a specification of the non-contact IC card system applied to the present embodiment, it is guaranteed to write only eight blocks for each, so that it is necessary to divide nine or more TOC's to be updated into 8 blocks for each writing. Then, in the n-th writing, the Types of up to the 7n-th TOC are set to Unused (not used) and the Type of the (7n+1)th TOC is set to Erasing (erasable). In the (n+1)th writing, the Types of seven TOC's from the (7n+1)th TOC are set to Unused (not used), and the Type of the (7n+8)th TOC is set to Erasing (erasable).

As described above, for each TOC rewriting transaction in the Garbage Collection, the Type of the end TOC is not set to Unused (not used) but to Erasing (erasable), that is, the Garbage Collection is not carried out, so that it is possible to restart the Garbage Collection with the end TOC being Erasing (erasable) if a transaction is not successfully completed because of a communication interruption, for example.

Figure 19:
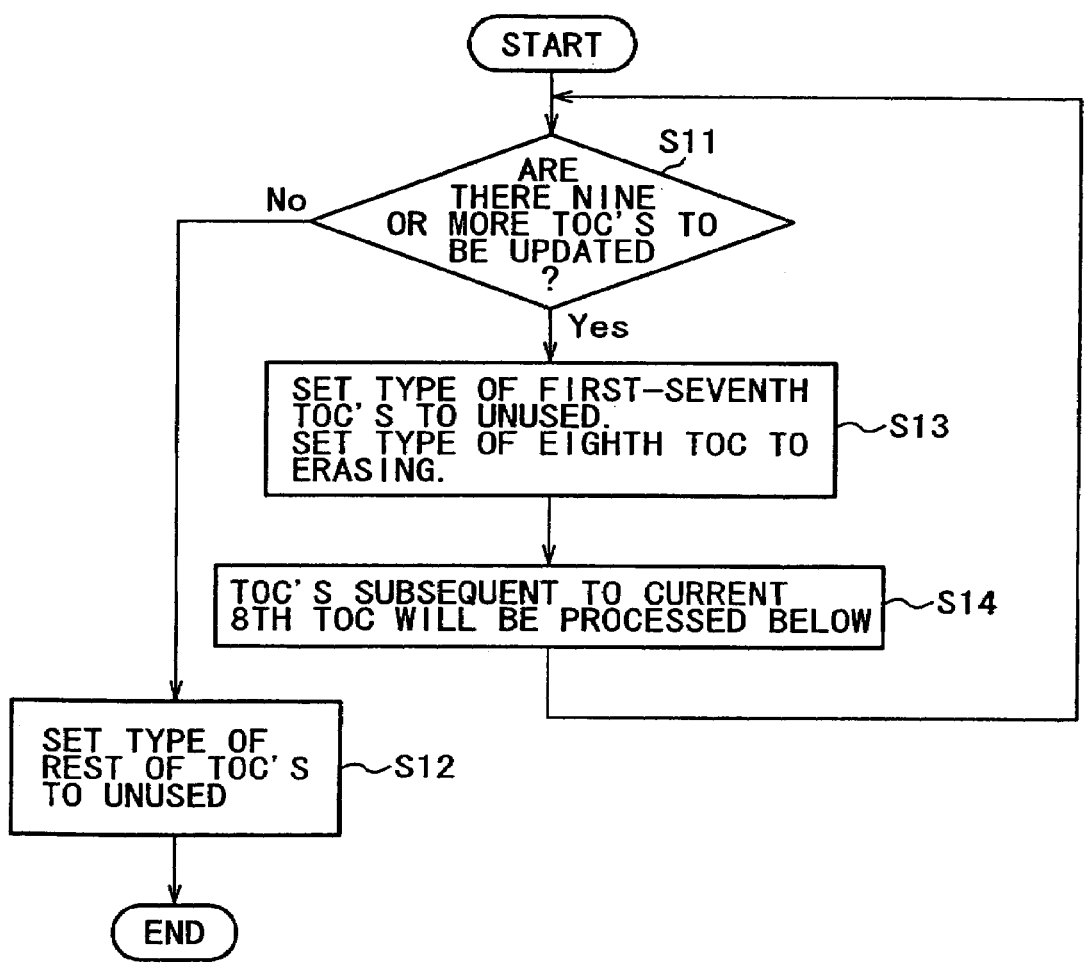
FIG. 19 is a flow chart showing a procedure for performing garbage collection of the TOC's.

FIG. 19 shows in a flow chart a procedure of rewriting the TOC's for when performing the Garbage Collection.

At first it is determined whether or not the number of TOC's to be updated is nine or more, that is, if single transaction may not complete the update of all the TOC's (step S11).

When the number of the TOC's to be updated is eight or less that is single transaction can complete the Garbage Collection, the Types of all of the rest of TOC's are rewritten to change into Unused (not used) (step S12) and the whole process routine is terminated. The rewrite operation for these TOC's is carried out by only single transaction.

On the other hand, when there are nine or more TOC's to be updated, the Types of the first to the seventh TOC's are set to Unused (not used) and the Type of the eighth TOC is set to Erasing (erasable) (step S3). The rewrite operation for these TOC's is carried out by only single transaction (T11).

Hereafter, the TOC's after the eighth at present are processed (step S14).

In other words, returning to step S11, it is determined if there are nine or more TOC's to be updated left, that is, if single transaction may not update the updating of all the TOC's.

When there are still nine or more TOC's to be updated left, the Types of the first to the seventh TOC's are set to Unused (not used) and the Type of the eighth TOC is set to Erasing (erasable) (step S3). The rewrite operation for these TOC's is carried out by only single transaction (T12) (the same as above).

Supplement

With reference to specific embodiments, the present invention has been described above, however, it is obvious for a person skilled in the art to alter or substitute the present embodiments without departing from the scope of the present invention.

Although the proximity communication system constructed by utilizing the IC card technology in the present embodiments as described by way of examples in the specification, another type of proximity communication system may realize the present invention similarly. Of course, the present invention may be applicable to not only local proximity communication but also conventional communication between devices for writing data into a memory or other storage devices in order to guarantee the data consistency.

In summary, by way of examples, the present invention has been disclosed, so that the description of the specification is not intended to limit the invention. The appended claims should be construed in order to determine the feature of the invention.

INDUSTRIAL APPLICABILITY

According to the present invention, there are provided a superior proximity communication system and a proximity communication method, a data management apparatus and a data management method, a storage medium, and a computer program in which a user physically places devices closer to each other so as to operate automatically and an operation is guaranteed even if the communication between the devices is interrupted at any timing in case the user pulls away the devices from each other.

Further, according to the present invention, there are provided a superior proximity communication system and a proximity communication method, a data management apparatus and a data management method, a storage medium, and a computer program in which the data consistency is suitably guaranteed if the communication between the devices is interrupted at any timing in the case of writing data larger than a predetermined size.

The invention claimed is:

1. A proximity communication system for rewriting data in response to a request from an external device in the proximity thereof, comprising:
    a memory area having one or more data blocks for rewriting the data in response to the request for rewriting data from the external device and control information provided for each of the data blocks,
    a data rewrite control section for controlling the rewrite of a corresponding data block and its control information in response to the request from the external device for rewriting data,
    wherein the data rewrite control section performs a rewrite in a single transaction by performing the rewrite operation en bloc when a sum of control information relating to rewriting a data block is equal to or less than an allowable rewritten data size, and
    wherein the data rewrite control section performs a rewrite in a single transaction by dividing the control information, in a linked order, into a plurality of groups, each of which can be rewritten in a single transaction, when the sum of the control information relating to rewriting the data block exceeds the allowable rewritten data size, and writing information that enables continuing performance of the following transaction in each transaction into an end control information even if the rewrite operation is interrupted.

2. The proximity communication system as claimed in claim 1, characterized in that said control information comprises link information to a corresponding data block and link information to control information corresponding to a subsequent data block, and
    indicates that the corresponding data block is in either a used state, an unused state, during-write state, or erasable state.

3. The proximity communication system as claimed in claim 2, characterized in that said memory area further comprises a bootstrap including link information to a head of control information.

4. The proximity communication system as claimed in claim 3, characterized in that said data rewrite control section, in response to the request for rewriting data with respect to data blocks linked from said bootstrap,
    searches for data blocks in the unused state having capacity to be further written,
    performs, by means of a guaranteed transaction, a rewrite of a series of control information by changing the control information corresponding to a head of the searched data blocks from the unused state into the during-write state, changing control information of other data blocks into the used state, and forming a link between respective control information so as to sequentially trace the data blocks from a head of data block,
    writes the data requested to be rewritten into the searched data blocks by tracing the link formed between the control information,
    performs, by means of single transaction, a rewrite of the series of control information by changing the control information corresponding to the head of the searched data blocks from the during-write state into the used state, changing control information of a head of the previous data blocks from the used state into the erasable state, and changing the link from said bootstrap so as to indicate the control information of the head of said searched data blocks, and
    performs, by means of a guaranteed transaction, a rewrite of the series of control information by changing control information indicative of the erasable state and all of the control information linked therefrom into the unused state.

5. The proximity communication system as claimed in claim 4, characterized in that when said data rewrite control section performs a rewrite of the series of control information by changing the control information corresponding to a head of the searched data blocks from the unused state into the during-write state, changing control information of other data blocks into the used state, and forming a link between respective control information so as to sequentially trace the data blocks from a headmost data block,
    said data rewrite control section performs a rewrite operation in a single transaction by performing the rewrite operation en bloc when a sum of control information is equal to or less than K, wherein K corresponds to the allowable rewritten data size of the control information that is capable of being rewritten in a single transaction, and
    divides the control information, in a linked order, into a plurality of groups, each of which can be rewritten in a single transaction, when sum of the control information relating to rewriting the data block exceeds K, and in the n-th transaction each of the links of the $\{(K-1) \times n-(K-2)\}$th to the $\{(K-1) \times n\}$th control information is caused to indicate the next control information, and a rewrite operation of setting the $\{(K-1)n+1\}$th link of control information to 0 (or null) is repeated.

6. The proximity communication system as claimed in claim 4, characterized in that when said data rewrite control section performs a rewrite of the series of control information by changing the control information indicative of the erasable state and all of the control information linked therefrom into the unused state, said data rewrite control section performs a rewrite operation in a single transaction by performing the rewrite operation en bloc when a sum of control information is equal to or less than K, wherein K corresponds to the allowable rewritten data size of the control information that is capable of being rewritten in a single transaction, and divides the control information, in a linked order, into a plurality of groups, each of which can be rewritten in a single transaction, when sum of the control information relating to rewriting the data block exceeds K, and in the n-th rewrite up to the $\{(K-1)\times n\}$th control information are set to the unused state, and a rewrite operation of setting the $\{(K-1)\times n+1\}$th control information to the erasable state is repeated.

7. The proximity communication system as claimed in claim 2, characterized in that the data block is capable of including link information to control information with respect to a relating data block.

8. The proximity communication system as claimed in claim 7, characterized in that said data rewrite control section, in response to a request for rewriting data with respect to data blocks linked from another data block, searches for data blocks in the unused state having capacity to be further written, performs, by means of a guaranteed transaction, a rewrite of the series of control information by changing the control information corresponding to a head of the searched data blocks from the unused state into the during-write state, changing control information of other data blocks into the used state, and forming a link between respective control information so as to sequentially trace the data blocks from a headmost data block, writes the data requested to be rewritten into the searched data blocks by tracing the link formed between the control information, performs, by means of single transaction, a rewrite of the series of control information by replacing the control information of the head of the searched data blocks with the control information of the head of the previous data blocks, changing the control information of the head of the searched data blocks from the during-write state into the used state, and changing the control information of the head of the previous data blocks from the used state to the erasable state, and performs, by means of a guaranteed transaction, a rewrite of the series of control information by changing control information indicative of the erasable state and all of the control information linked therefrom into the unused state.

9. A proximity communication method of rewriting data in response to a request from an external device in the proximity thereof, a memory area comprises one or more data blocks for rewriting the data in response to the request from the external device, and control information provided for each of the data blocks, the method comprising:

performing a rewrite operation in a single transaction by performing the rewrite operation en bloc when a sum of control information relating to rewriting a data block is equal to or less than an allowable rewritten data size, and performing a rewrite operation in a single transaction by dividing the control information, in a linked order, into a plurality of groups, each of which can be rewritten in a single transaction, when the sum of the control information relating to rewriting the data block exceeds the allowable rewritten data size, and writing information that enables continuing performance of the following transaction in into an end control information even if the rewrite operation is interrupted.

10. The proximity communication method as claimed in claim 9, characterized in that said control information has link information to a corresponding data block and link information to control information corresponding to a subsequent data block and indicates that the corresponding data block is in either a used state, an unused state, during-write state, or erasable state.

11. The proximity communication method as claimed in claim 10, characterized in that said memory area further comprises a bootstrap including link information to a head of control information.

12. The proximity communication method as claimed in claim 11, characterized in that rewriting data to said memory area comprises:

searching for data blocks in the unused state having capacity to be further written in response to a request for rewriting data with respect to data blocks linked from said bootstrap, performing, by means of a guaranteed transaction, a rewrite of a series of control information by changing the control information corresponding to a head of the searched data blocks from the unused state into the during-write state, changing control information of other data blocks into the used state, and forming a link between respective control information so as to sequentially trace the data blocks from a head of data block, writing the data requested to be rewritten into the searched data blocks by tracing the link formed between the control information, performing, by means of single transaction, a rewrite of the series of control information by changing the control information of the head of said searched data blocks from the during-write state into the used state, changing control information of a head of the previous data blocks from the used state into the erasable state, and changing the link from said bootstrap so as to indicate the control information of the head of said searched data blocks, and performing, by means of a guaranteed transaction, a rewrite of the series of control information by changing control information indicative of the erasable state and all of the control information linked therefrom into the unused state.

13. The proximity communication system as claimed in claim 12, characterized in that rewriting data to said memory area when performing a rewrite of the series of control information by changing the control information corresponding to a head of the searched data blocks from the unused state into the during-write state, changing control information of other data blocks into the used state, and forming a link between respective control information so as to sequentially trace the data blocks from a headmost data block, comprises:

performing a rewrite operation in a single transaction by performing the rewrite operation en bloc when a sum of control information to be rewritten is equal to or less than K, wherein K corresponds to the allowable rewritten data size of the control information that is capable of being rewritten in a single transaction, and dividing the control information, in a linked order, into a plurality of groups, each of which can be rewritten in a single transaction, when sum of the control information relating to rewriting the data block exceeds K, and in the n-th transaction each of the links of the $\{(K-1)\times n-(K-2)\}$th to the $\{(K-1)\times n\}$th control information is caused to indicate next control information, and a rewrite operation of selling the $\{(K-1)n+1\}$th link of control information to 0 (or null) is repeated.

14. The proximity communication method as claimed in claim 12, characterized in that rewriting data to said memory area when performing a rewrite of the series of control information by changing the control information indicative of the erasable state and all of the control information linked therefrom into the unused state, comprises:

performing a rewrite operation in a single transaction by performing the rewrite operation en bloc when a sum of control information to be rewritten is equal to or less than K, wherein K corresponds to the allowable rewritten data size of the control information that is capable of being rewritten in a single transaction, and dividing the control information, in a linked order, into a plurality of groups, each of which can be rewritten in a single transaction, when sum of the control information relating to rewriting the data block exceeds K, and in the n-th write up to the $\{(K-1)\times n\}$th control information are set to the unused state, and a rewrite operation of setting the $\{(K-1)\times n+1\}$th control information to the erasable state is repeated.

15. The proximity communication method as claimed in claim 10, characterized in that the data block can include link information to control information with respect to a relating data block.

16. The proximity communication method as claimed in claim 15, characterized in that rewriting data to said memory area comprises:

searching for data blocks in the unused state having capacity to be further written in response to a request for rewriting data with respect to data blocks linked from another data block, performing, by means of a guaranteed transaction, a rewrite of the series of control information by changing the control information corresponding to a head of the searched data blocks from the unused state into the during-write state, changing control information of other data blocks into the used state, and forming a link between respective control information so as to sequentially trace the data blocks from a head of data block, writing the data requested to be rewritten into the searched data blocks by tracing the link formed between the control information, performing, by means of a single transaction, a rewrite of the series of control information by replacing the control information of the head of the searched data blocks with the control information of the head of the previous data blocks, changing the control information of the head of the searched data blocks from the during-write state into the used state, and changing the control information of the head of the previous data blocks from the used state to the erasable state, and performing, by means of a guaranteed transaction, a rewrite of the series of control information by changing control information indicative of the erasable state and all of the control information linked therefrom into the unused state.

17. A data management apparatus for managing data in a system in which data is rewritten in a single transaction comprising:

a memory area of the system is provided with one or more data blocks for writing a user data and control information for managing each data block, and a data rewrite control section for controlling the rewrite of a corresponding data block and its control information, wherein the data rewrite control section performs a rewrite in a single transaction by performing the rewrite operation en bloc when a sum of control information relating to rewriting a data block is equal to or less than an allowable rewritten data size, and wherein the data rewrite control section performs a rewrite in a single transaction by dividing the control information, in a linked order, into a plurality of groups, each of which can be rewritten in a single transaction, when the sum of the control information relating to rewriting the data block exceeds the allowable rewritten data size, and writing information that enables continuing performance of the following transaction into an end control information even if the rewrite operation is interrupted.

18. The data management apparatus as claimed in claim 17, characterized in that said control information has link information to a corresponding data block and link information to control information corresponding to a subsequent data block and indicates that the corresponding data block is in either a used state, an unused state, during-write state, or erasable state.

19. The data management apparatus as claimed in claim 17, characterized in that said memory area further comprises a bootstrap including link information to a headmost control information.

20. The data management apparatus as claimed in claim 19, characterized by, in response to a request for rewriting data with respect to data blocks linked from said bootstrap, searching for data blocks in the unused state having capacity to be further written, performing, by means of a guaranteed transaction, a rewrite of a series of control information by changing the control information corresponding to a head of the searched data blocks from the unused state into the during-write state, changing control information of other data blocks into the used state, and forming a link between respective control information so as to sequentially trace the data blocks from a headmost data block, writing the data requested to be rewritten into the searched data blocks by tracing the link formed between the control information, performing, by means of a single transaction, a rewrite of the series of control information by changing the control information of the head of the searched data blocks from the during-write state into the used state, and changing the control information of the head of the previous data blocks from the used state to the erasable state, and performing, by means of a guaranteed transaction, a rewrite of the series of control information by changing control information indicative of the erasable state and all of the control information linked therefrom into the unused state.

21. The data management apparatus as claimed in claim 20, characterized by when performing a rewrite of the series of control information by changing the control information corresponding to a head of the searched data blocks from the unused state into the during-write state, changing control information of other data blocks into the used state, and forming a link between respective control information so as to sequentially trace the data blocks from a head of data block, performing a rewrite operation in a single transaction by performing the rewrite operation en bloc when a sum of control information to be rewritten is equal to or less than K, wherein K corresponds to the allowable rewritten data size of the control information that is capable of being rewritten in a single transaction, and dividing the control information, in a linked order, into a plurality of groups, each of which can be rewritten in a single transaction, when sum of the control information relating to rewriting the data block exceeds K, and in the n-th transaction each of the links of the {(K−1)× n−(K−2)}th to the {(K−1)×n}th control information being caused to indicate next control information, and a rewrite operation of setting the {(K−1)n+1}th link of control information to 0 (or null) being repeated.

22. The data management apparatus as claimed in claim 20, characterized by when performing a rewrite of the series of control information by changing the control information indicative of the erasable state and all of the control information linked therefrom into the unused state, performing a rewrite operation in a single transaction by performing the rewrite operation en bloc when a sum of control information to be rewritten is equal to or less than K, wherein K corresponds to the allowable rewritten data size of the control information that is capable of being rewritten in a single transaction, and dividing the control information, in a linked order, into a plurality of groups, each of which can be rewritten in a single transaction, when sum of the control information relating to rewriting the data block exceeds K, and in the n-th write up to the {(K−1)×n}th control information being set to the unused state, and a rewrite operation of setting the {(K−1)×n+1}th control information to the erasable state being repeated.

23. The data management apparatus as claimed in claim 17, characterized in that the data block can include link information data to control information with respect to a relating data block.

24. The data management apparatus as claimed in claim 23, characterized by, in response to a request for rewriting data with respect to data blocks linked from another data block, searching for data blocks in the unused state having capacity to be further written, performing, by means of a guaranteed transaction, a rewrite of a series of control information by changing the control information corresponding to a head of the searched data blocks from the unused state into the during-write state, changing control information of other data blocks into the used state, and forming a link between respective control information so as to sequentially trace the data blocks from a headmost data block, writing the data requested to be rewritten into the searched data blocks by tracing the link formed between the control information, performing, by means of a single transaction, a rewrite of the series of control information by replacing the control information of the head of the searched data blocks with the control information of the head of the previous data blocks, changing the control information of the head of the searched data blocks from the during-write state into the used state, and changing the control information of the head of the previous data blocks from the used state to the erasable state, and performing, by means of a guaranteed transaction, a rewrite of the series of control information by changing control information indicative of the erasable state and all of the control information linked therefrom into the unused state.

25. A data management method of managing data in a system in which data is rewritten in a single transaction comprising:

providing a memory area with one or more data blocks for writing a user data and control information for managing each data block, performing a rewrite operation in a single transaction by performing the rewrite operation en bloc when a sum of control information relating to rewriting a data block is eaual to or less than an allowable rewritten data size, and performing a rewrite operation in a single transaction by dividing the control information, in a linked order, into a plurality of groups, each of which can be rewritten in a single transaction, when the sum of the control information relating to rewriting the data block exceeds the allowable rewritten data size, and writing information that enables continuing performance of the following transaction into an end control information even if the rewrite operation is interrupted.

26. The data management method as claimed in claim 25, characterized in that said control information has link information to a corresponding data block and link information to control information corresponding to a subsequent data block and indicates that the corresponding data block is in either a used state, an unused state, during-write state, or erasable state.

27. The data management method as claimed in claim 25, characterized in that said memory area further comprises a bootstrap including link information to a head of control information.

28. The data management method as claimed in claim 27, characterized by comprising:

a step of searching for data blocks in the unused state having capacity to be further written, in response to a request for rewriting data with respect to data blocks linked from said bootstrap, a step of performing, by means of a guaranteed transaction, a rewrite of a series of control information by changing the control information corresponding to a head of the searched data blocks from the unused state into the during-write state, changing control information of other data blocks into the used state, and forming a link between respective control information so as to sequentially trace the data blocks from a headmost data block, a step of writing the data requested to be rewritten into the searched data blocks by tracing the link formed between the control information, a step of performing, by means of a single transaction, a rewrite of the series of control information by changing the control information of the head of the searched data blocks from the during-write state into the used state, changing control information of a head of the previous data blocks from the used state into the erasable state, and changing the link from said bootstrap so as to indicate the control information of the head of said searched data blocks, and a step of performing, by means of a guaranteed transaction, a rewrite of the series of control information by changing control information indicative of the erasable state and all of the control information linked therefrom into the unused state.

29. The data management method as claimed in claim 28, characterized in that the step of performing a rewrite of the series of control information by changing the control information corresponding to a head of the searched data blocks from the unused state into the during-write state, changing control information of other data blocks into the used state, and forming a link between respective control information so as to sequentially trace the data blocks from a headmost data block, further comprises:

a sub-step of performing a rewrite operation in a single transaction by performing the rewrite operation en bloc when a sum of control information to be rewritten is equal to or less than K, wherein K corresponds to the allowable rewritten data size of the control information that is capable of being rewritten in a single transaction, and a sub-step of dividing the control information, in a linked order, into a plurality of groups, each of which can be rewritten in a single transaction, when sum of the control information relating to rewriting the data block exceeds K, and in the n-th transaction each of the links of the $\{(K-1)\times n-(K-2)\}$th to the $\{(K-1)\times n\}$th control information being caused to indicate next control information, and a rewrite operation of setting the $\{(K-1)n+1\}$th link of control information to 0 (or null) being repeated.

30. The data management method as claimed in claim 28, characterized in that, in the step of performing the data rewrite operation of said memory area, a step of performing a rewrite of the series of control information by changing the control information indicative of the erasable state and all of the control information linked therefrom into the unused state, further comprises:

a sub-step of performing a rewrite operation in a single transaction by performing the rewrite operation en bloc when a sum of control information to be rewritten is equal to or less than K, wherein K corresponds to the allowable rewritten data size of the control information that is capable of being rewritten in a single transaction, and a sub-step of dividing the control information, in a linked order, into a plurality of groups, each of which can be rewritten in a single transaction, when sum of the control information relating to rewriting the data block exceeds K, and in the n-th write up to the $\{(K-1)\times n\}$th control information being set to the unused state, and a rewrite operation of setting the $\{(K-1)\times n+1\}$th control information to the erasable state being repeated.

31. The data management method as claimed in claim 25, characterized in that the data block can include link information to control information with respect to a relating data block.

32. The data management method as claimed in claim 31, characterized by comprising:

a step of searching for data blocks in the unused state having capacity to be further written, in response to a request for rewriting data with respect to data blocks linked from another data block, a step of performing, by means of a guaranteed transaction, a rewrite of a series of control information by changing the control information corresponding to a head of the searched data blocks from the unused state into the during-write state, changing control information of other data blocks into the used state, and forming a link between respective control information so as to sequentially trace the data blocks from a headmost data block, a step of writing the data requested to be rewritten into the searched data blocks by tracing the link formed between the control information, a step of performing, by means of a single transaction, a rewrite of the series of control information by replacing the control information of the head of the searched data blocks with the control information of the head of the previous data blocks, changing the control information of the head of the searched data blocks from the during-write state into the used state, and changing the control information of the head of the previous data blocks from the used state to the erasable state, and a step of performing, by means of a guaranteed transaction, a rewrite of the series of control information by changing control information indicative of the erasable state and all of the control information linked therefrom into the unused state.

33. A storage medium having stored therein computer software, in a computer-readable format, described so as to execute a data rewrite process on a computer system in response to a request from an external device in the proximity thereof, characterized in that a memory area comprises one or more data blocks for rewriting the data in response to the request from the external device, and control information provided for each of the data blocks, a rewrite operation is performed in single transaction by performing the rewrite operation en bloc when a sum of control information relating to rewriting a data block is equal to or less than an allowable rewritten data size, and a rewrite operation is performed in a single transaction by dividing the control information, in a linked order, into a plurality of groups, each of which can be rewritten in a single transaction, when the sum of the control information relating to rewriting the data block exceeds the allowable rewritten data size, and writing information that enables continuing performance of the following transaction into an end control information even if the rewrite operation is interrupted.

34. A storage medium having stored therein computer software, in a computer-readable format, described so as to execute, on a computer system, a data management method on a system in which single transaction is guaranteed, the method comprising:

providing a memory area of the system with one or more data blocks for writing a user data thereto and control information for managing each data block, performing a rewrite operation in a single transaction by performing the rewrite operation en bloc when a sum of control information relating to rewriting a data block is equal to or less than an allowable rewritten data size, and performing a rewrite operation in a single transaction by dividing the control information, in a linked order, into a plurality of groups, each of which can be rewritten in a single transaction, when the sum of the control information relating to rewriting the data block exceeds the allowable rewritten data size, and writing information that enables continuing performance of the following transaction into an end control information even if the rewrite operation is interrupted.

35. A computer-readable medium having a computer program for executing, on a computer system, a process for rewriting data in a memory area in response to a request from an external device in the proximity thereof, the memory area comprising one or more data blocks for rewriting the data in response to the request from the external device, and control information provided for each of the data blocks, the process comprising the steps of:

performing a rewrite operation is performed in single transaction by performing the rewrite operation en bloc when a sum of control information relating to rewriting a data block is eaual to or less than an allowable rewritten data size, and performing a rewrite operation is performed in a single transaction by dividing the control information, in a linked order, into a plurality of groups, each of which can be rewritten in a single transaction, when the sum of the control information relating to rewriting the data block exceeds the allowable rewritten data size, and writing information that enables continuing performance of the following transaction into an end control information even if the rewrite operation is interrupted.

36. A computer-readable medium having a computer program for executing, on a computer system, a data management process in a system in which rewriting data in a memory area in a single transaction is guaranteed, comprising:

performing a rewrite operation in a single transaction by performing the rewrite operation en bloc when a sum of control information relating to rewriting a data block is equal to or less than an allowable rewritten data size, and performing a rewrite operation in a single transaction by dividing the control information, in a linked order, into a plurality of groups, each of which can be rewritten in a single transaction, when the sum of the control information relating to rewriting the data block exceeds the allowable rewritten data size, and writing information that enables continuing performance of the following transaction into an end control information even if the rewrite operation is interrupted rewriting the user data of the data block and rewriting the control information by means of a transaction that guarantees rewriting operation associated with the rewriting of the user data.

* * * * *